(12) United States Patent
Tejada et al.

(10) Patent No.: US 8,264,568 B2
(45) Date of Patent: Sep. 11, 2012

(54) IMAGE PICKUP DEVICE

(75) Inventors: Jose Tejada, Valencia (ES); Rafael Dominguez-Castro, Seville (ES); Fernando Medeiro-Hidalgo, Seville (ES); Francisco J. Jimenez-Garrido, Seville (ES)

(73) Assignee: Texas Instruments Incorporated, Dallas, TX (US)

( * ) Notice: Subject to any disclaimer, the term of this patent is extended or adjusted under 35 U.S.C. 154(b) by 310 days.

(21) Appl. No.: 12/700,485

(22) Filed: Feb. 4, 2010

(65) Prior Publication Data

US 2010/0277623 A1 Nov. 4, 2010

(30) Foreign Application Priority Data

Feb. 4, 2009 (JP) .................................. 2009-023744

(51) Int. Cl.
*H04N 5/235* (2006.01)

(52) U.S. Cl. .................................. 348/230.1; 348/229.1

(58) Field of Classification Search ................. 348/230.1
See application file for complete search history.

(56) References Cited

U.S. PATENT DOCUMENTS

| 7,750,950 | B2 * | 7/2010 | Tamaru et al. | 348/227.1 |
| 2005/0052554 | A1 * | 3/2005 | Sakurai et al. | 348/301 |
| 2006/0239582 | A1 * | 10/2006 | Hyoudou | 382/274 |
| 2009/0309999 | A1 * | 12/2009 | Hirai et al. | 348/241 |
| 2010/0002118 | A1 * | 1/2010 | Wang et al. | 348/308 |
| 2011/0058083 | A1 * | 3/2011 | Oshima et al. | 348/311 |

* cited by examiner

*Primary Examiner* — Anthony J Daniels
(74) *Attorney, Agent, or Firm* — Robert D. Marshall, Jr.; Wade James Brady, III; Frederick J. Telecky, Jr.

(57) ABSTRACT

This invention is an image pickup device that realizes a wide dynamic range while minimizing circuit area using a pixel array that can pick up a low-sensitivity image and a high-sensitivity image. This invention obtains information (S1/S2) needed for generating a correction coefficient using one more than the number of pixels readout circuits (RC1 to RCn+1). This significantly reduces the circuit area compared with the case of using twice as many readout circuits as pixels for generating the correction coefficient.

9 Claims, 12 Drawing Sheets

IMAGE PICKUP DEVICE

CLAIM OF PRIORITY

This application claims priority under 35 U.S.C. 119(a) to Japanese Patent Application No. 2009-023744 filed Feb. 4, 2009.

TECHNICAL FIELD OF THE INVENTION

The technical field of this invention is an image pickup device having a wide dynamic range, such as an image pickup device that uses image sensors generating two kinds of pixel signals having different sensitivity characteristics to realize a wide dynamic range.

BACKGROUND OF THE INVENTION

A typical CMOS (complementary metal-oxide semiconductor) image sensor has a pixel array and a readout circuit. Each pixel circuit of the pixel array includes a photodiode and an amplifier. The voltage generated in the photodiode is amplified by the amplifier and output to a column signal line. A pixel is read out twice by the readout part in order to perform a noise cancellation treatment known as CDS (correlated double sampling). Pixel signals of dark level (N) and signal level (NS) are read out, and a new pixel signal (S) corresponding to the difference between the signals (N-NS) is obtained. Analog-digital conversion (AD conversion) is usually performed to the pixel signal (S) after CDS in order to facilitate image processing.

The signal charge of each pixel is read out by a method that combines a parallel method and a sequential method. Each row of the pixel array is selected sequentially. Pixel signals are read out in parallel from the plural columns of the selected row. The degree of parallelism varies corresponding to the degree of readout processing performed for each column. Table 1 shows the content of readout processing performed for each column and the degree of parallelism.

TABLE 1

| Degree of parallelism | N/NS memory | CDS | Signal amplification | AD conversion |
|---|---|---|---|---|
| Low | ○ | — | — | — |
| Medium | ○ | ○ | ○ | — |
| High | ○ | ○ | ○ | ○ |

Increasing the degree of parallelism can help improve the performance while lowering power consumption. This is the reason that integration of elements at the column level has been energetically promoted in the case of improving the resolution of the image sensor. In recent years, a CMOS image sensor equipped with an AD converter in each column has been developed.

SUMMARY OF THE INVENTION

However, the CMOS image sensor with a wide dynamic range disclosed in Japanese Patent Application No. 2005-083790 to Zaihyo simultaneously picks up two images at different sensitivity levels. The two images are synthesized into one image by selecting either a bright one or a dark one for each pixel. When synthesizing two images, it is necessary to correct the sensitivity of the image appropriately so that the response of the system is always linear.

The diagram of FIG. 14 explains correction processing in a CMOS image sensor that generates high-sensitivity pixel signal S1 and low-sensitivity pixel signal S2.

FIG. 14 illustrates the high-sensitivity pixel signal S1 has a higher signal level than low-sensitivity pixel signal S2. The low-sensitivity pixel signal S2 is more difficult to saturate than the high-sensitivity pixel signal S1. A wide dynamic range can be realized by selecting pixel signal S1 in the range where pixel signal S1 is not saturated (when the level of pixel signal S1 does not reach a prescribed threshold value) and selecting pixel signal S2 when this range is exceeded.

When low-sensitivity pixel signal S2 is selected, in order to maintain the linearity of the entire sensitivity characteristic, pixel signal S2 is multiplied by a coefficient K. Coefficient K is calculated depending on the ratio between pixel signals S1 and S2 (S1/S2). Although coefficient K is very stable in each pixel circuit, the value may have a variation of 10% or more due to manufacturing variations between different chips. Therefore, it is necessary to use a filter to calculate the coefficient K in image processing. For example, the filter calculates coefficient K averaged for all pixels in the image per frame. In this case, since it is necessary to obtain two pixel signals (S1, S2) for the same pixel, the amount of information to process is doubled.

FIG. 15 illustrates a comparative example of the area of a normal CMOS sensor and a wide dynamic range type CMOS sensor. In a normal CMOS sensor, since it is only necessary to process one type of pixel signal for each pixel, only one readout part 12 is needed for one pixel array 11. On the other hand, in the aforementioned wide dynamic range type CMOS sensor, since it is necessary to process two kinds of pixel signals for each pixel, two readout parts 12A, 12B are needed for one pixel array 11.

As shown in FIG. 15, since the number of readout parts needed is doubled for the aforementioned wide dynamic range type CMOS, it is difficult to avoid an increase in the circuit area. Since the processing amount of information read out from the pixel array is doubled, the power consumption is increased. In order to avoid this problem, a method that uses a common readout part for the two kinds of pixel signals (S1, S2) has been considered. However, since only one pixel signal can be obtained and coefficient K cannot be calculated, the two images with different sensitivities cannot be synthesized appropriately.

The objective of the present invention is to solve the aforementioned problem by providing an image pickup device that uses a pixel array that picks up a low-sensitivity image and a high-sensitivity image to realize a dynamic range while restraining an increase in the circuit area.

The image pickup device based on a first aspect of the present invention has a pixel array including plural pixel circuits, each of which generates a first pixel signal having a first sensitivity characteristic and a second pixel signal having a second sensitivity characteristic with lower sensitivity than the first sensitivity characteristic, N signal lines, a pixel scanning circuit that sequentially selects N pixel circuits in the pixel array and outputs the first and second pixel signals from the selected N pixel circuits to the N signal lines in a time division manner, plural readout circuits in a number that is larger than N by at least 1, which select and output either the first pixel signal or second pixel signal input from the signal lines, a connection circuit that connects two of the readout circuits to at least one signal line out of the N signal lines and connects one of the readout circuits to each of the other signal lines, a correction coefficient generation circuit that generates a correction coefficient corresponding to the sensitivity ratio between the first sensitivity characteristic and the second sensitivity characteristic, and a correction circuit that corrects the level of the second pixel signal output from the readout circuit to a signal level corresponding to the first sensitivity characteristic based on the correction coefficient. Each of the readout circuits connected in a one-to-one relationship to the signal lines selects and outputs the first pixel signal if the first pixel signal is smaller than a threshold value corresponding to the saturation signal level of the first sensitivity characteristic and selects and outputs the second pixel signal if the first pixel signal is larger than the threshold value. For the two readout circuits connected to one signal line, one of the readout circuits selects and outputs the first pixel signal, while the other readout circuit selects and outputs the second pixel signal. The correction coefficient generation circuit generates the correction coefficient corresponding to the signal ratio between the first pixel signal output from one of the two readout circuits connected to one signal line and the second pixel signal output from the other readout circuit.

By using the image pick up device, N signal lines of the pixel circuits are connected to the readout circuits in a number that is larger than N by at least 1 via the connection circuit. At least one of the N signal lines is connected to two of the readout circuits, while each of the other signal lines is connected to one readout circuit.

Each of the readout circuits connected in a one-to-one relationship to the signal lines selects and outputs either the first pixel signal having the first sensitivity characteristic or the second pixel signal having the second sensitivity characteristic with a lower sensitivity than the first sensitivity characteristic. If the first pixel signal is smaller than a threshold value corresponding to the saturation signal level of the first sensitivity characteristic, the first pixel signal will be read out. If the first pixel signal is larger than the threshold value, the second pixel signal will be read out.

On the other hand, for the two readout circuits connected to one signal line, one readout circuit selects and outputs the first pixel signal, while the other readout circuit selects and outputs the second pixel signal. In other words, the first and second pixel signals generated in the same pixel circuit are read out. The correction coefficient is generated corresponding to the signal ratio between the first and second pixel signals generated in the same pixel circuit. The level of the second pixel signal output from the readout circuit is corrected to a signal level corresponding to the first sensitivity characteristic based on the correction coefficient.

Preferably, the correction coefficient generation circuit generates the correction coefficient corresponding to a value obtained by averaging the signal ratios between the first and second pixel signals read out from plural the pixel circuits.

Preferably, the correction coefficient generation circuit excludes from the averaged samples the signal ratio with the first and/or second pixel signals deviating from a prescribed range and/or the signal ratio deviating from a prescribed range.

Preferably, the connection circuit changes the signal line connected to two of the readout circuits out of the N signal lines randomly or based on a prescribed repetition pattern every time N new pixel circuits are selected in the pixel scanning circuit.

Preferably, the connection circuit connects each pixel circuit included in the pixel array to two of the readout circuits via one of the signal lines the same number of times in one loop of the repetition pattern.

Preferably, the correction coefficient generation circuit supplies the same correction coefficient to the correction circuit with respect to a series of pixel signals that form one image picked up in the pixel array.

Preferably, the image pickup device also has a serial conversion circuit that converts the signals output in parallel from the plural readout circuits into a serial signal string and a rearrangement circuit that rearranges the pixel signals of the N pixel circuits corresponding to the connection state of the connection circuit when the N pixel circuits are selected in the pixel scanning circuit such that the pixel signals of the N pixel circuits are arranged side by side sequentially corresponding to the arrangement of the N pixel circuits in the pixel array in the serial signal string output from the serial conversion circuit.

Preferably, the readout circuit includes a comparison circuit that compares the first pixel signal input from the signal line with the threshold value and outputs a control signal indicating the comparison result. The serial conversion circuit converts the control signal along with the pixel signals into the serial signal string. The correction circuit determines whether each pixel signal included in the signal string is the second pixel signal based on the control signal and performs the correction to pixel signals identified as the second pixel signals.

Preferably, the plural readout circuits include a first readout circuit that outputs the first pixel signal and a second readout circuit that outputs the second pixel signal. The connection circuit connects the first and second readout circuits to one of the signal lines and changes the one signal line randomly or based on the repetition pattern. The correction coefficient generation circuit generates the correction coefficient corresponding to the ratio between the first pixel signal output from the first readout circuit and the second pixel signal read out from the second readout circuit.

Preferably, the connection circuit changes the two readout circuits connected to a common signal line out of the plural readout circuits randomly or based on the repetition pattern and when two of the readout circuits are connected to the common signal line by the connection circuit, one of the two readout circuits functions as the first readout circuit, while the other readout circuit functions as the second readout circuit.

The image pickup device based on a second aspect of the present invention has a pixel array including plural row selection lines, plural column signal lines, and plural pixel circuits arranged in a matrix form and connected to the row selection lines and column signal lines, wherein each of the pixel circuits includes a photodiode, a first capacitance element selectively connected to the photodiode and used for storing photocharges, a second capacitance element selectively connected to the first capacitance element, and an output transistor used for outputting a pixel signal corresponding to the stored photocharges, and the pixel circuit outputs a first pixel signal corresponding to the photocharges stored in the first capacitance element and a second pixel signal corresponding to the photocharges stored in the first and second capacitance element, to the column signal line, a readout part including plural first readout circuits, a second readout circuit receiving the input of the first pixel signal, and a third readout circuit receiving the input of the second pixel signal, which receives the first and second pixel signals and selects the first or second pixel signal corresponding to the signal level of the first pixel signal, a connection circuit that connects one column signal line selected from the plural column signal lines to the second and third readout circuits and connects other column signal lines to the first readout circuits, respectively, a coefficient calculation circuit that receives the input of the first pixel signal output from the second readout circuit and the second pixel signal output from the third readout circuit and calculates a coefficient based on the ratio between the signals, and a correction circuit that receives the input of a pixel signal output from the readout part and outputs the input pixel signal directly if the input pixel signal is a first pixel signal and performs an operation to the input pixel signal using the coefficient and outputs the result if the input pixel signal is a second pixel signal.

Preferably, the column signal line connected to the second and third readout circuits varies periodically.

The first readout circuit preferably includes a comparison circuit that compares the first pixel signal with a prescribed threshold value and outputs the comparison result and the correction circuit determines whether the input pixel signal is a first or second pixel signal based on the comparison result.

BRIEF DESCRIPTION OF THE DRAWINGS

These and other aspects of this invention are illustrated in the drawings, in which.

DETAILED DESCRIPTION OF PREFERRED EMBODIMENTS

In the FIGS: 1 represents a pixel array; 10 represents a pixel circuit; 2 represents a vertical scan circuit; 3 represents a readout processing circuit; 4 represents a control circuit; 21 represents a pulse shift circuit; 22, 305, 305A, 305B, 306 represent a switch circuit; 31 represents a connection circuit; 32 represents a readout part; 33 represents a serial conversion circuit; 34 represents a rearrangement circuit; 35 represents a correction coefficient generation circuit; 36 represents a comparison circuit; 301, 302 represent an amplifier; 303 represents an AD converter; 304, 347 represent a comparison circuit; 307 represents a current source; 308, 309 represent a NOR circuit; 311 to 314 represent a buffer circuit; 341 represents a demultiplexer; 342 represents a serial conversion circuit; 343 to 345, 346_1 to 346_n represent flip-flops; 351 represents a signal ratio calculation circuit; 352 represents an averaging circuit; 361 represents a multiplier; 362 represents a multiplexer; PD represents a photodiode; Q1 to Q5 represent MOS transistors; CS, Cns1, Cns2, Cn1, Cn2 represent capacitors; RC1 to RCn+1 represent readout circuits; RW1 to RWj represent row signal lines; and CM1 to CMn represent column signal lines.

According to the present invention, two kinds of pixel signals with high sensitivity and low sensitivity are read out in some of the plural readout circuits, while one of the two kinds of pixel signals is selected and output in other readout circuits. Therefore, it is possible to generate a correction coefficient for the sensitivity characteristic needed to realize a wide dynamic range and restrain an increase in the area caused by readout circuits.

First Embodiment

Figure 1:
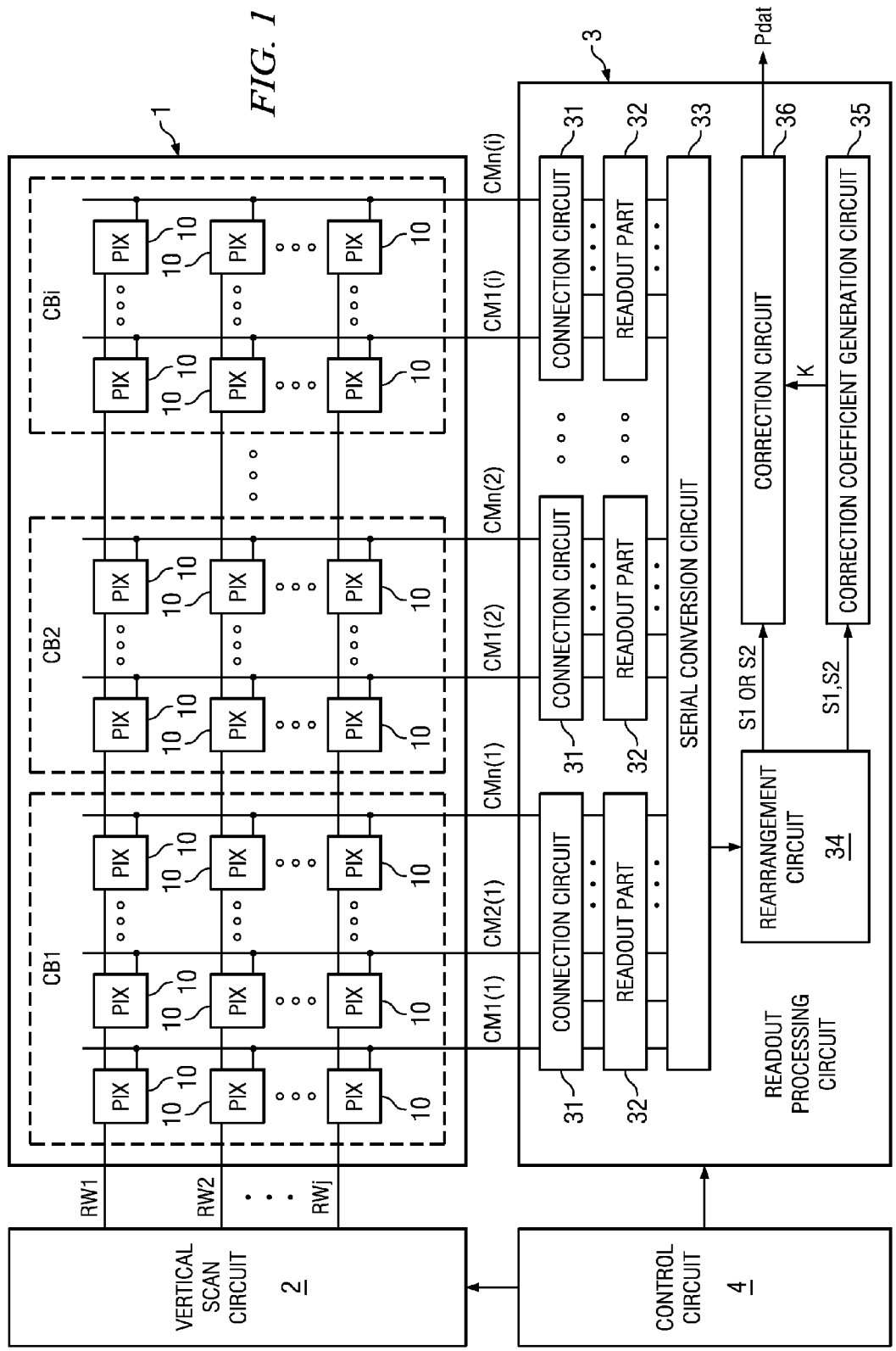
FIG. 1 illustrates an example of the configuration of the image pickup device of a first embodiment.

FIG. 1 illustrates an example of the configuration of the image pickup device of a first embodiment of the present invention. The image pickup device of this embodiment has pixel array 1, vertical scan circuit 2, readout processing circuit 3, and control circuit 4.

Pixel array 1 is an embodiment of the pixel array of the present invention.

Vertical scan circuit 2 is an embodiment of the pixel scan circuit of the present invention.

Pixel Array 1

Pixel array 1 has plural pixel circuits 10 that generate two kinds of pixel signals S1, S2 with different sensitivity characteristics. Pixel circuits 10 are arranged, for example, in a matrix form. They are connected to common row signal lines RW1, RW2, . . . for each row and are connected to common column signal lines CM1, CM2, . . . for each column.

The pixel circuits 10 of pixel array 1 are divided into i blocks (column blocks) CB1 to CBi, each of which has n columns. In FIG. 1, the numbers in the parentheses beside column signal lines CM1, CM2, . . . indicate the numbers of the corresponding column blocks CB1 to CBi. The n column signal lines CM1 to CMn in a column block are connected to n+1 readout circuits RC1 to RCn+1 (FIG. 4) via connection circuit 31 to be described later.

In the following explanation, any column block (CB1 to CBi) may be represented by symbol "CB."

Figure 2:
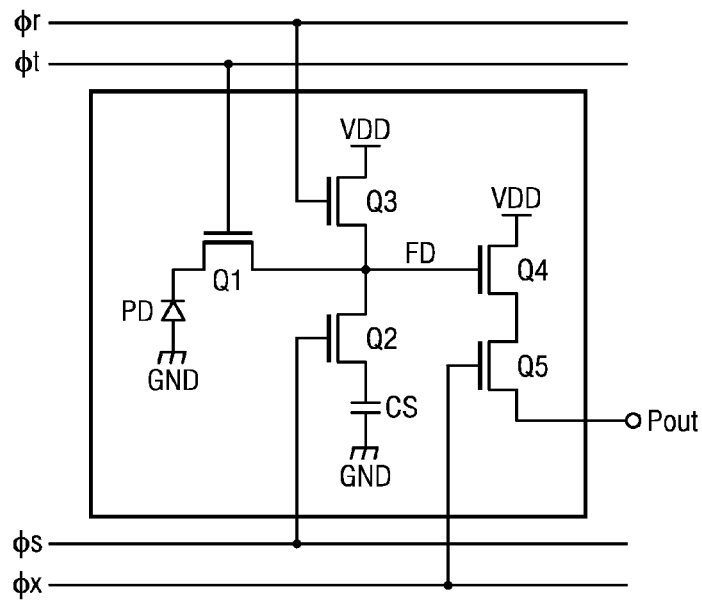
FIG. 2 illustrates an example of the configuration of a pixel circuit.

FIG. 2 shows an example of the configuration of pixel circuit 10. Pixel circuit 10 has photodiode PD that generates photocharges when receiving the light of an image pickup object, n-type MOS transistors Q1 to Q5, and capacitor Cs.

The anode of photodiode PD is connected to reference potential GND, and the cathode is connected to floating diffusion region FD via MOS transistor (transfer transistor) Q1. One of the terminals of capacitor CS is connected to reference potential GND, while the other terminal is connected to floating diffusion region FD via MOS transistor (storage transistor) Q2. MOS transistor (reset transistor) Q3 is connected between power supply line VDD and floating diffusion region FD. The gate of MOS transistor (amplification transistor) Q4 is connected to the floating diffusion region FD. Its drain is connected to power supply line VDD, and its source is connected to output Pout via MOS transistor (selection transistor) Q5. Control signals φt, φs, φr, φx are input into the gates of MOS transistors Q1, Q2, Q3, Q5 via row signal lines, respectively. The pixel signals generated in pixel circuits 10 are output from output Pout to column signal lines (CM1 to CMn).

Pixel circuit 10 shown in FIG. 2 operates as follows.

When the previous field ends, in a state in which transfer transistor Q1 is turned off and storage transistor Q2 is turned on, reset transistor Q3 is turned on. As a result, the photocharges stored in the coupling capacitance of capacitor CS and floating diffusion region FD in the previous field are discharged to prepare starting of the next field. When the next field is started, reset transistor Q3 is turned off.

Immediately after resetting performed by reset transistor Q3, noise generated in company with resetting is stored as charged in the coupling capacitance of capacitor CS and floating diffusion region FD. The output signal of amplification transistor Q4 corresponding to the charge is read out as reset level signal N2 to readout processing circuit 3. Reset level signal N2 is used for CDS processing when generating low-sensitivity pixel signal S2.

After being reset, the device enters a period for storing photocharges (storage period). During the storage period, control signal $\phi t$ is adjusted such that the potential barrier of transfer transistor Q1 becomes somewhat lower than that in the off state. As a result, photocharges overflowing from the capacitance of photodiode PD are stored in the coupling capacitance of capacitor CS and floating diffusion region FD. If the illuminance is low, photocharges are only stored in the capacitance of photodiode PD. If the illuminance is high, photocharges overflowing from the capacitance of photodiode PD are also stored in the coupling capacitance of capacitor CS and floating diffusion region FD.

When the storage period ends, transfer transistor Q1 and storage transistor Q2 are turned off, and the floating diffusion region is separated from capacitor CS. Then, reset transistor Q3 is turned on, and the photocharges stored in floating diffusion region FD are discharged.

Immediately after resetting performed by reset transistor Q3, noise generated in company with the resetting is stored as charge in floating diffusion region FD. An output signal of amplification transistor Q4 corresponding to the charge is read out as reset level signal N1 to readout processing circuit 3. Reset level signal N1 is used to generate high-sensitivity pixel signal S1 (CDS processing).

After floating diffusion region FD is reset, transfer transistor Q1 is turned on. Since floating diffusion region FD has a lower potential than photodiode PD, all photocharges stored in the capacitance of photodiode PD are transferred to floating diffusion region FD. After the charges are transferred, transfer transistor Q1 is turned off. At that time, a signal output from amplification transistor Q4 corresponding to the photocharges transferred to floating diffusion region FD is read out as pixel signal NS1 to readout processing circuit 3. Pixel signal NS1 includes the component of the photocharges stored in the capacitance of photodiode PD and the component of reset level signal N1. A high-sensitivity pixel signal S1 is generated by subtracting reset level signal N1 from pixel signal NS1.

After the photocharges of photodiode PD are transferred to floating diffusion region FD, storage transistor Q2 is turned on from the off state, and then transfer transistor Q1 is turned on from the off state. In this way, the capacitance is re-coupled between floating diffusion region FD and capacitor CS. The photocharges (including the part overflowing from the capacitance of photodiode PD) generated in photodiode PD during the storage period accumulate in the coupling capacitance. After the charges accumulate in the coupling capacitance, transfer transistor Q1 is turned off. At that time, a signal output from amplification transistor Q4 corresponding to the charges in the coupling capacitance is read out as pixel signal NS2 to readout processing circuit 3. Pixel signal NS2 includes the component of the photocharges stored in the capacitance of photodiode PD, floating diffusion region FD and capacitor CS and the component of reset level signal N2. Low-sensitivity pixel signal S2 is generated by subtracting reset level signal N2 from pixel signal NS2.

When one field is ended as described above, the photocharges stored in the coupling capacitance of floating diffusion region FD and capacitor CS are reset, and the operation of the next field is repeated. During the period when the signals (N1, N2, NS1, NS2) are read out in readout processing circuit 3, control signal $\phi x$ is set to the high level, and selection transistor Q5 is turned on.

In the aforementioned operation example, after reset level signal N2 is read out, other signals (N1, NS1, NS2) are read out through the storage period. Therefore, in order to obtain a group of pixel signals (S1, S2) by means of CDS processing from the four signals, it is necessary to store reset level signal N2 during the period of 1 field. As a result, a memory (field memory) is needed. However, if the variation in reset level signal N2 is very small, the field memory can be omitted by carrying out CDS processing using reset level signal N2 in the next field.

Vertical Scan Circuit 2

Vertical scan circuit 2 sequentially selects the pixel matrix of pixel array 1 for each row and outputs the pixel signals of pixel circuits 10 belonging to the selected row to column signal lines CM1, CM2, . . . .

Figure 3:
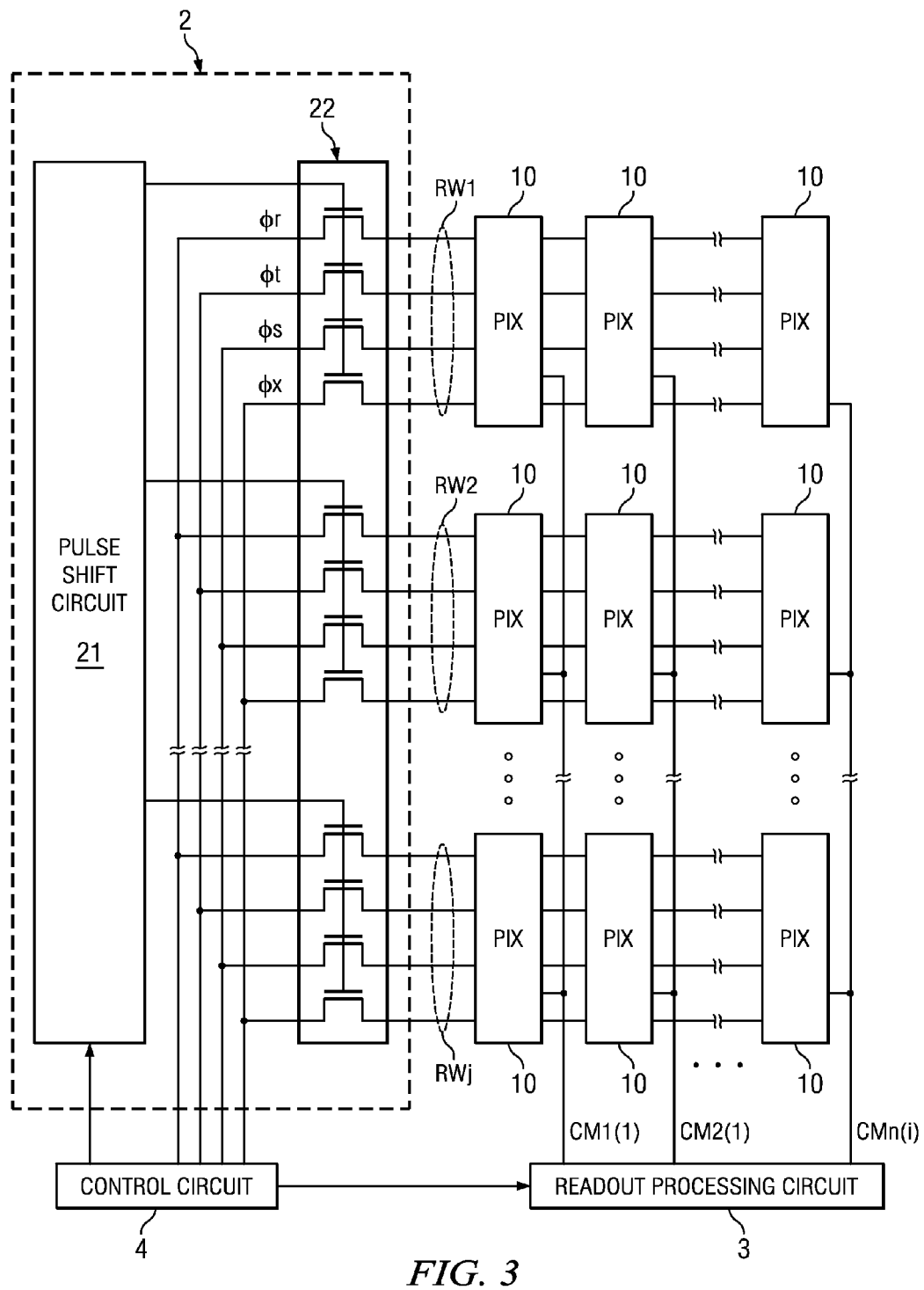
FIG. 3 illustrates an example of the configuration of a vertical scan circuit.

FIG. 3 illustrates an example of the configuration of vertical scan circuit 2. Vertical scan circuit 2 shown in FIG. 3 has pulse shift circuit 21 and switch circuit 22.

Pulse shift circuit 21 generates pulse signals that shift sequentially corresponding to a control signal (start signal, vertical scan clock signal or the like) generated in control circuit 4. Pulse shift circuit 21 is constituted by a shift register, for example.

Switch circuit 22 connects the control signal lines ($\phi r$, $\phi t$, $\phi s$, $\phi x$) of pixel circuit 10 to one of row signal lines RW1 to RWj corresponding to the pulse signal of pulse shift circuit 21. Switch circuit 22 is constituted by transistors that are turned on/off corresponding to the pulse signal of pulse shift circuit 21 as shown in FIG. 3.

Readout Processing Circuit 3

Readout processing circuit 3 reads out the pixel signals of pixel circuits 10 of one row of pixel array 1 selected sequentially by vertical scan circuit 2 and performs CDS, amplification, AD conversion, sensitivity correction or other processing to the read out pixel signals to generate pixel data Pdat.

As shown in FIG. 1, readout processing circuit 3 has i connection circuits 31 and i readout parts 32 corresponding to i column blocks CB1 to CBi, serial conversion circuit 33, rearrangement circuit 34, correction coefficient generation circuit 35, and correction circuit 36.

Connection circuit 31 is an embodiment of the connection circuit of the present invention.

Correction coefficient generation circuit 35 is an embodiment of the correction coefficient generation circuit of the present invention.

Correction circuit 36 is an embodiment of the correction circuit of the present invention.

Rearrangement circuit 34 is an embodiment of the rearrangement circuit of the present invention.

Figure 4:
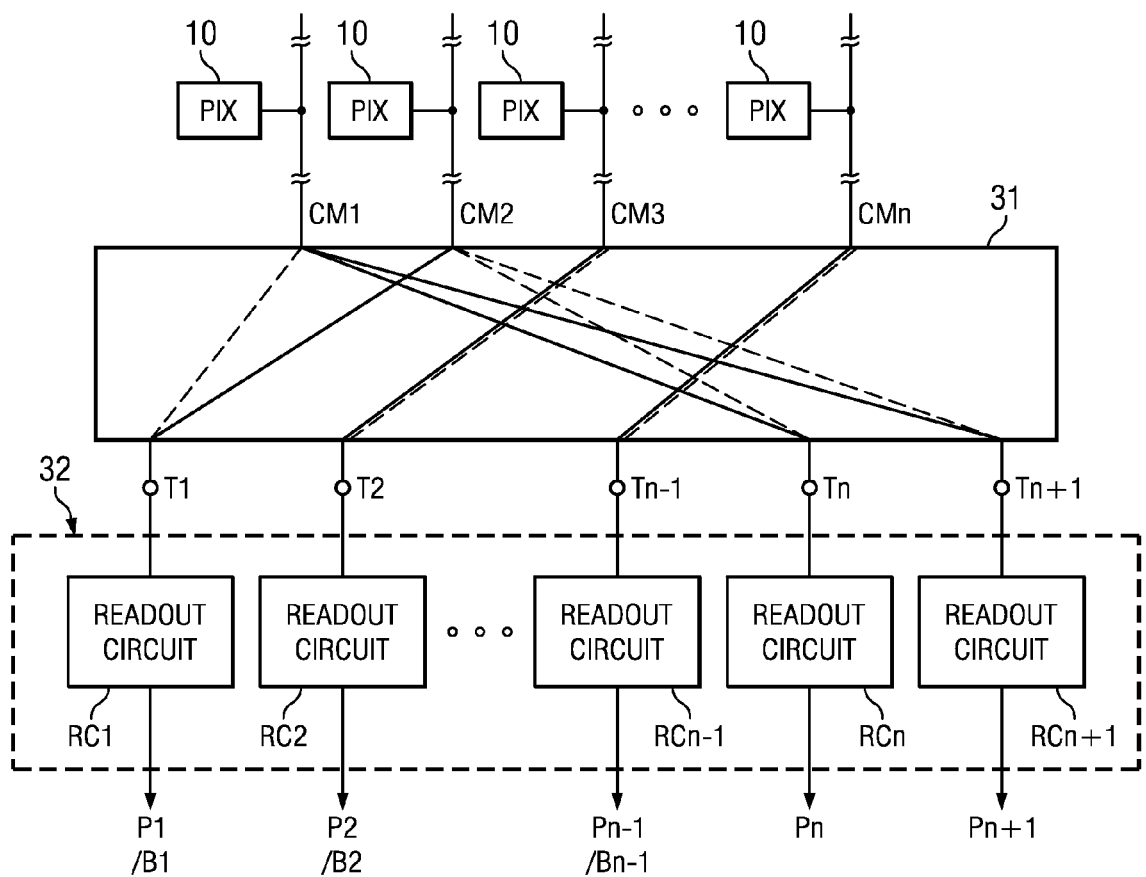
FIG. 4 illustrates a configuration example of a connection circuit and a readout part.

FIG. 4 shows a configuration example of connection circuit 31 and readout part 32.

In the example shown in FIG. 4, readout part 32 has n+1 readout circuits RC1 to RCn+1. Each readout circuit (RC1 to RCn+1) reads out pixel signals from pixel circuit 10 and performs CDS, signal amplification, AD conversion, or other processing to the pixel signals. The number of readout circuits (RC1 to RCn+1) included in readout part 32 is one larger than the number of column signal lines (CM1 to CMn) included in column block CB.

Connection circuit 31 connects the n+1 readout circuits RC1 to RCn+1 of readout part 32 and then column signal lines CM1 to CMn of column block CB under control of control circuit 4. Connection circuit 31 connects two readout circuits (RCn, RCn+1) to one column signal line among n column signal lines CM1 to CMn and connects one readout circuit (RC1 to RCn−1) to one of the other n−1 column signal lines.

Connection circuit 31 changes the one column signal line out of the N column signal lines of column block CB connected to two readout circuits (RCn, RCn+1) every time a new row is selected in vertical scan circuit 2 (for each line) based on a certain repetition pattern. An example repetition pattern will be explained later with reference to FIG. 10.

However, the operation of reading out pixel signals S1, S2 is different for the readout circuits (RC1 to RCn−1) that are connected to the column signal lines in a one-to-one relationship and for the two readout circuits (RCn, RCn+1) connected to one column signal line.

The readout circuits (RC1 to RCn−1) that are connected to the column signal lines in a one-to-one relationship select either high-sensitivity pixel signal S1 or low-sensitivity pixel signal S2 read out from pixel circuit 10. That is, readout circuits (RC1 to RCn−1) compare threshold value Vth, set corresponding to the saturation signal level of the sensitivity characteristic with high sensitivity, with pixel signal S1. If pixel signal S1 is smaller than threshold value Vth (when pixel signal S1 does not reach the saturation signal level), the readout circuit will select and output pixel signal S1. If pixel signal S1 is larger than threshold value Vth (when pixel signal S1 reaches the saturation signal level), the readout circuit will select and output pixel signal S2.

On the other hand, out of the two readout circuits (RCn, RCn+1) connected to one column signal line, readout circuit (RCn) outputs high-sensitivity pixel signal S1, while the other readout circuit (RCn+1) outputs low-sensitivity pixel signal S2.

Figure 5:
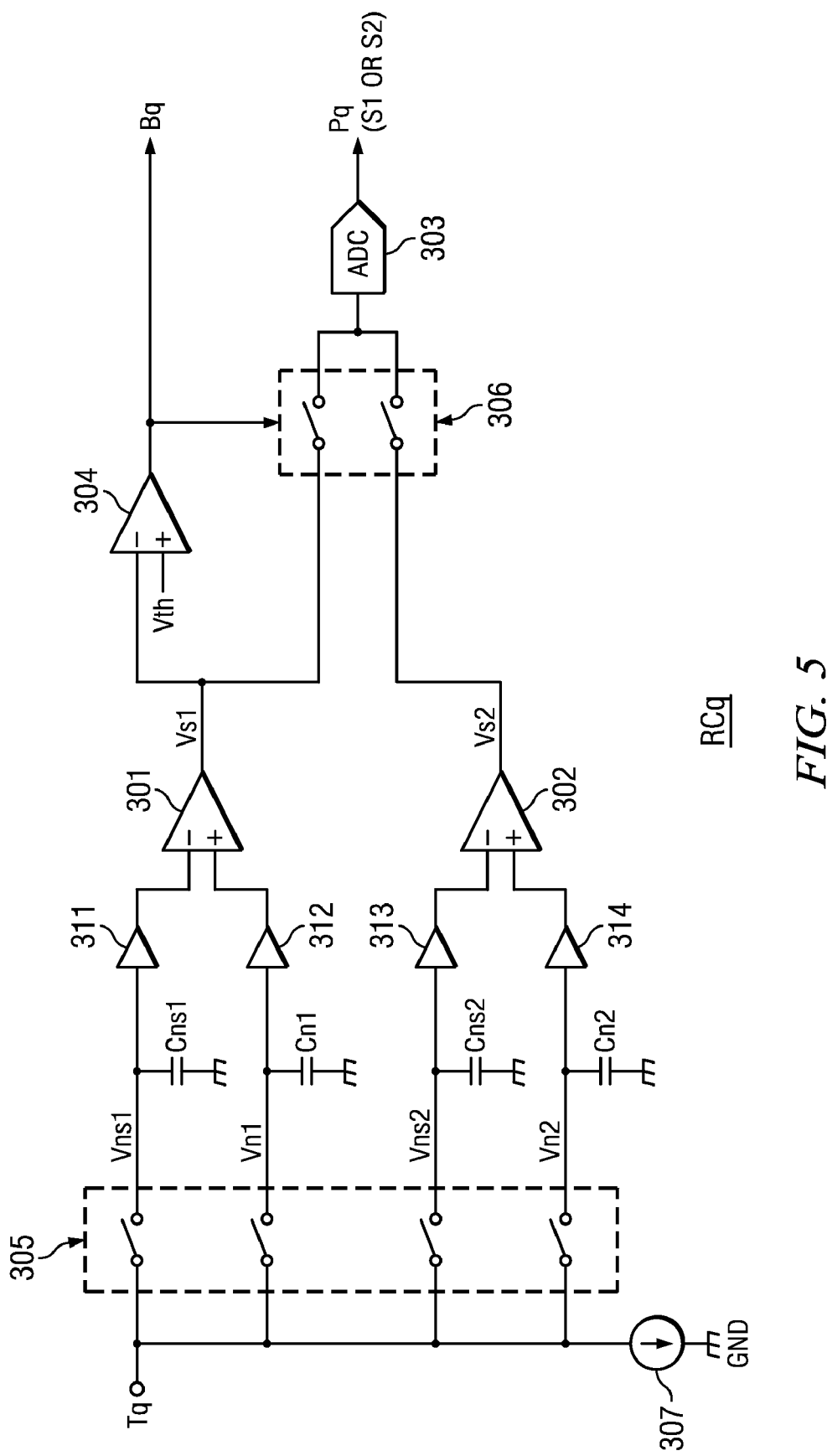
FIG. 5 illustrates a configuration example of the readout circuit that is connected in a one-to-one relationship to one column signal line.

FIG. 5 illustrates a configuration example of readout circuit RCq ("q" is an integer in the range of 1 to n−1) connected to a column signal line in a one-to-one relationship.

Readout circuit RCq shown in FIG. 5 has amplifiers 301, 302, AD converter 303, comparison circuit 304, switch circuits 305, 306, current source 307, buffer circuits 311 to 314, and capacitors Cns1, Cn1, Cns2, Cn2.

Comparison circuit 304 is an embodiment of the comparison circuit of the present invention.

Current source 307 is connected to the output of pixel circuit 10 via input terminal Tq, connection circuit 31, and a column signal line and supplies a constant current to the source of amplification transistor Q4 (FIG. 2).

For capacitors Cns1, Cn1, Cns2, Cn2, one of the terminals is connected to reference potential GND, while the other terminal is connected to input terminal Tq via switch circuit 305. Switch circuit 305 selectively connects capacitors Cns1, Cn1, Cns2, Cn2 and input terminal Tq under control of control circuit 4.

Amplifier 301 amplifies the difference (Vn1−Vns1) between the voltage Vns1 of capacitor Cns1 input via buffer circuit 311 and the voltage Vn1 of capacitor Cn1 input via buffer circuit 312 and outputs the result as voltage Vs1.

Amplifier 302 amplifies the difference (Vn2−Vns2) between the voltage Vns2 of capacitor Cns2 input via buffer circuit 313 and the voltage Vn2 of capacitor Cn2 input via buffer circuit 314 and outputs the result as voltage Vs2.

Comparison circuit 304 compares the voltage Vs1 output from amplifier 301 with threshold value Vth and outputs a control signal Bq indicating the comparison result. Comparison circuit 304 outputs control signal Bq of "1" (high level) if voltage Vs1 is lower than threshold value Vth and outputs control signal Bq of "0" (low level) if voltage Vs1 exceeds threshold value Vth.

Switch circuit 306 selects and outputs voltage Vs1 if the control signal Bq output from comparison circuit 304 is "1" and selects and outputs voltage Vs2 if control signal Bq is "0."

AD converter 303 converts voltage Vs1 or Vs2 output from switch circuit 306 into a digital signal and outputs it as pixel datum Pq.

When the connection of switch circuit 305 is switched under control of control circuit 4, the four signals of pixel circuit 10 (NS1, N1, NS2, N2) are distributed to four capacitors (Cns1, Cn1, Cns2, Cn2). The voltage Vns1 of pixel signal NS1 is kept in capacitor Cns1, the voltage Vn1 of reset level signal N1 is kept in capacitor Cn1, the voltage Vns2 of pixel signal NS2 is kept in capacitor Cns2, and the voltage Vn2 of reset level signal N2 is kept in capacitor Cn2.

In amplifier 301, the difference (Vn1−Vns1) between voltages Vns1 and Vn1 is amplified, and voltage Vs1 corresponding to high-sensitivity pixel signal S1 is obtained. In amplifier 302, the difference (Vn2−Vns2) between voltages Vns2 and Vn2 is amplified, and voltage Vs2 corresponding to low-sensitivity pixel signal S2 is obtained.

In comparison circuit 304, voltage Vs1 is compared with threshold value Vth, and a control signal Bq indicating the comparison result is output. When switch circuit 306 is switched corresponding to control signal Bq, either voltage Vs1 or Vs2 is input into AD converter 303 and is converted into digital pixel datum Pq. If voltage Vs1 is lower than threshold value Vth, voltage Vs1 is subjected to AD conversion. If voltage Vs1 exceeds threshold value Vth, voltage Vs2 is subjected to AD conversion. In this way, if voltage Vs1 does not reach the saturation signal level, high-sensitivity pixel signal S1 is output as pixel datum Pq. If voltage Vs1 reaches the saturation signal level, low-sensitivity pixel signal S2 is output as pixel datum Pq.

The readout circuit Rq shown in FIG. 5 has been explained above.

Figure 6:
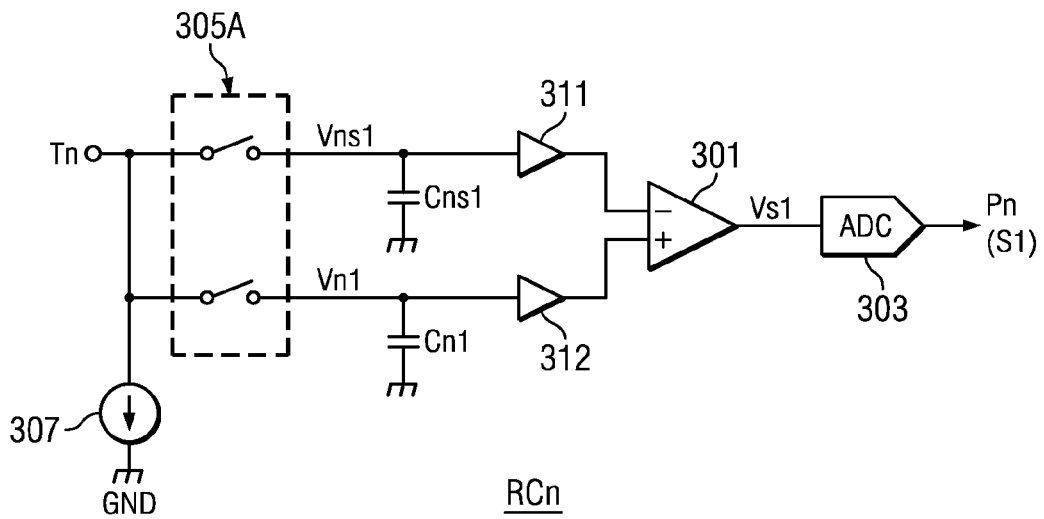
FIG. 6 illustrates a configuration example of one of two readout circuits connected to one column signal line.
Figure 7:
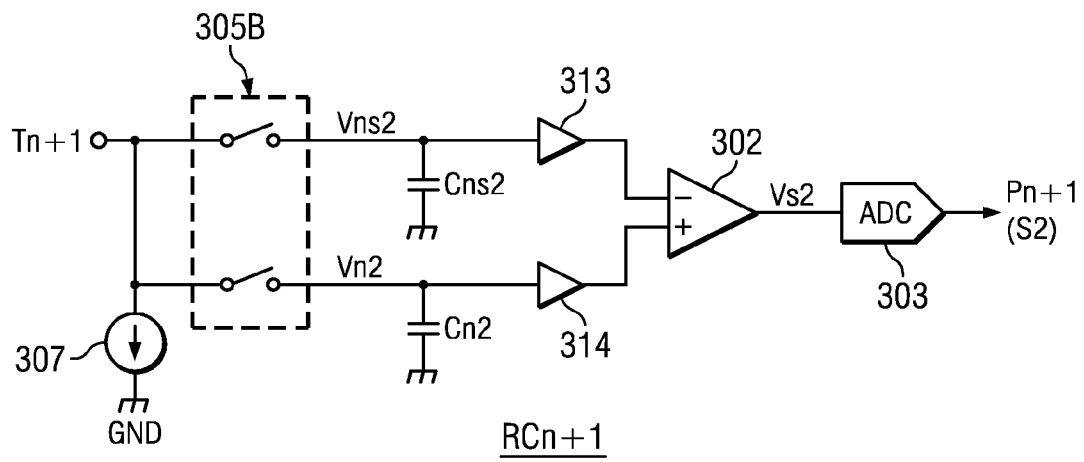
FIG. 7 illustrates a configuration example of the other of two readout circuits connected to one column signal line.

FIGS. 6 and 7 show configuration examples of the two readout circuits RCn, RCn+1 connected to one column signal line, respectively. FIG. 6 shows a configuration example of readout circuit RCn. FIG. 7 shows a configuration example of readout circuit RCn+1.

Readout circuit RCn shown in FIG. 6 has amplifier 301, AD converter 303, switch circuit 305A, current source 307, buffer circuits 311, 312, and capacitors Cns1, Cn1. The same symbols in FIGS. 6 and 5 represent the same constituent elements, respectively.

Switch circuit 305A selectively connects capacitors Cns1, Cn1 and input terminal Tn under control of control circuit 4. As a result of switching of switch circuit 305A, the voltage Vns1 of pixel signal NS1 is kept in capacitor Cns1, and the voltage Vn1 of reset level signal N1 is kept in capacitor Cn1. Amplifier 301 outputs voltage Vs1 corresponding to high-sensitivity pixel signal S1 by amplifying the difference (Vn1−Vns1) between voltage Vns1 and voltage Vn1. AD converter 303 converts the voltage Vs1 into a digital signal and outputs it as pixel datum Pn.

In this way, readout circuit RCn outputs pixel datum Pn corresponding to high-sensitivity pixel signal S1 output from pixel circuit 10.

Readout circuit RCn+1 shown in FIG. 7 has amplifier 302, AD converter 303, switch circuit 305B, current source 307, buffer circuits 313, 314, and capacitors Cns2, Cn2. The same symbols in FIGS. 7 and 5 represent the same constituent elements, respectively.

Switch circuit 305B selectively connects capacitors Cns2, Cn2 and input terminal Tn+1 under control of control circuit 4. As a result of switching of switch circuit 305B, the voltage Vns2 of pixel signal NS2 is kept in capacitor Cns2, and the voltage Vn2 of reset level signal N2 is kept in capacitor Cn2. Amplifier 302 outputs voltage Vs2 corresponding to low-sensitivity pixel signal S2 by amplifying the difference (Vn2−Vns2) between voltage Vns2 and voltage Vn2. AD converter 303 converts the voltage Vs2 into a digital signal and outputs it as pixel datum Pn+1.

In this way, readout circuit RCn+1 outputs pixel datum Pn+1 corresponding to low-sensitivity pixel signal S2 output from pixel circuit 10.

Readout circuits RCn, RCn+1 shown in FIGS. 6, 7 are explained above.

Return to FIG. 1.

Serial conversion circuit 33 converts pixel data (P1, P2, . . . ) output in parallel from readout circuits (RC1 to RCn+1) of readout part 32 and control signals (B1, B2, . . . ) into a serial signal string.

Rearrangement circuit 34 changes the arrangement of pixel data (P1, P2, . . . ) output in series from serial conversion circuit 33 corresponding to the connection state of column signal lines (CM1 to CMn) and readout circuits (RC1 to RCn+1) in connection circuit 31.

That is, rearrangement circuit 34 rearranges pixel data (P1, P2, . . . ) read out and transferred in series from one row of pixel circuits 10 of pixel array 1 in an order corresponding to the arrangement of the one row of pixel circuits 10. In this case, rearrangement circuit 34 rearranges pixel data (P1, P2, . . . ) read out from the one row of pixel circuits 10 corresponding to the connection state of connection circuit 31 when the one row of pixel circuits 10 is selected in vertical scan circuit 2.

Correction coefficient generation circuit 35 generates correction coefficient K corresponding to the sensitivity ratio of the two sensitivity characteristics (high sensitivity and low sensitivity) of pixel circuit 10. More specifically, correction coefficient generation circuit 35 generates correction coefficient K corresponding to the signal ratio (S1/S2) of high-sensitivity pixel signal S1 (pixel data Pn) to low-sensitivity pixel signal S2 (pixel data Pn+1) read out by readout circuits RCn and RCn+1 from the same pixel circuit 10.

Correction coefficient generation circuit 35 obtains plural the signal ratios (S1/S2) in different connection states of connection circuit 31 and generates correction coefficient K corresponding to the value obtained by averaging the obtained signal ratios (S1/S2).

Additionally, correction coefficient generation circuit 35 supplies the same correction coefficient K to correction circuit 36 with respect to a series of pixel data (P1, P2, . . . ) that form one image picked up in pixel array 1. That is, correction coefficient generation circuit 35 supplies the same correction coefficient K with respect to pixel data (P1, P2, . . . ) that form one frame. Correction coefficient K will not be updated during the frame. In this way, noise of the image caused by changing correction coefficient K can be prevented.

Correction circuit 36 corrects the level of the image data regarding low-sensitivity pixel signal S2 among pixel data (P1, P2, . . . ) output from readout part 32 to a level corresponding to the high-sensitivity characteristic based on correction coefficient K.

For example, correction circuit 36 determines whether each of the pixel data (P1, P2, . . . ) output from rearrangement circuit 34 is low-sensitivity pixel signal S2 based on control signal (B1, B2, . . . ) accompanying each pixel datum (P1, P2, . . . ). If the pixel datum is low-sensitivity pixel signal S2, correction circuit 36 multiplies it by correction coefficient K. Correction circuit 36 sequentially outputs the corrected data as pixel data Pdat.

Figure 8:
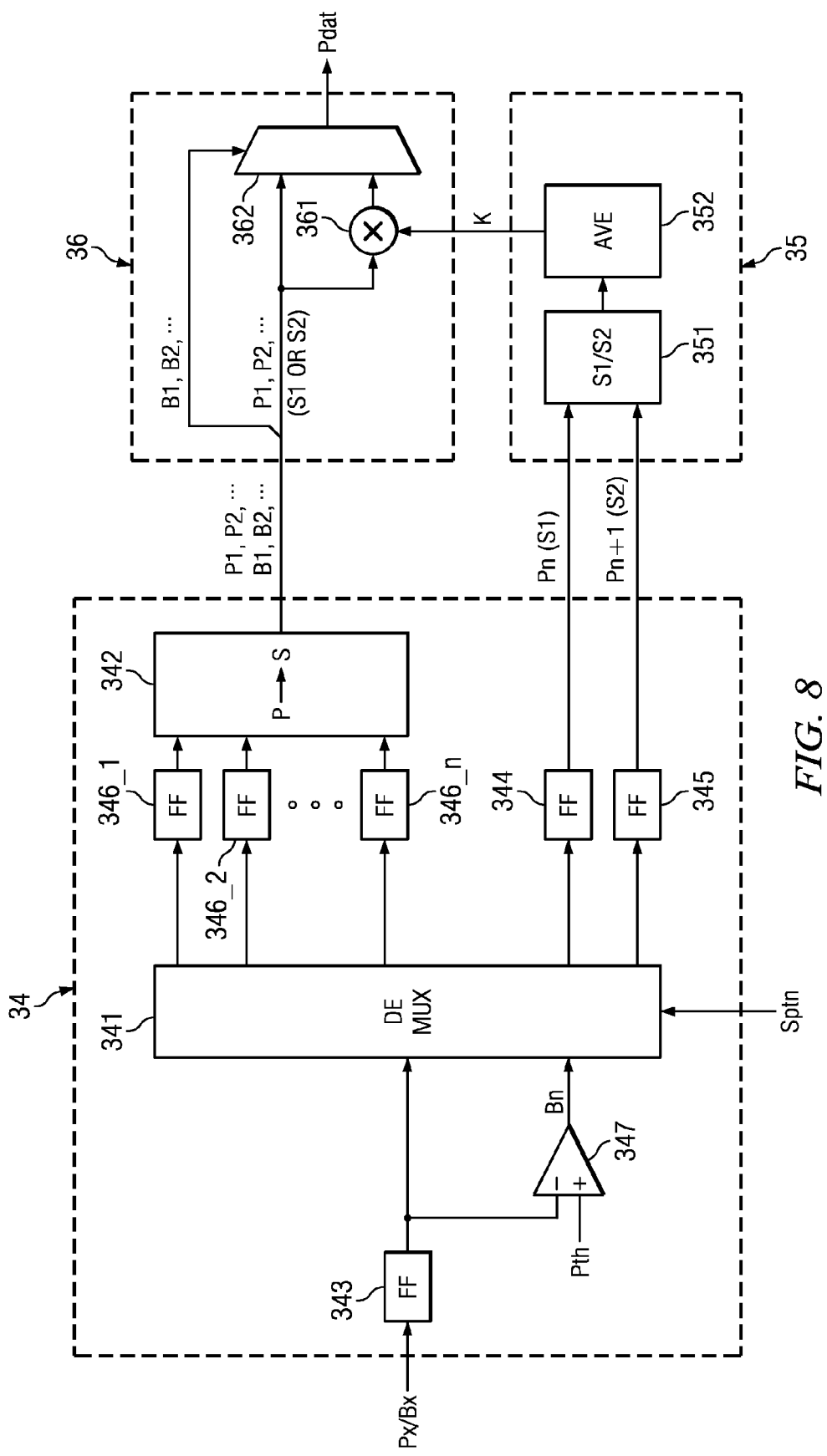
FIG. 8 illustrates a configuration example of a rearrangement circuit, correction coefficient generation circuit, and correction circuit.

FIG. 8 illustrates a configuration example of rearrangement circuit 34, correction coefficient generation circuit 35, and correction circuit 36.

Rearrangement circuit 34 shown in FIG. 8 has demultiplexer 341, serial conversion circuit 342, flip-flops 343 to 345, 346_1 to 346_$n$, and comparison circuit 347.

Flip-flop 343 holds pixel data (P1, P2, . . . ) output in series from serial conversion circuit 33.

Comparison circuit 347 compares the pixel datum Pn (pixel signal S1) of readout circuit RCn kept in flip-flop 343 with digital threshold value Pth corresponding to the analog threshold value Vth (FIG. 5). Comparison circuit 347 outputs the comparison result as control signal Bn to demultiplexer 341. Control signal Bn indicates whether pixel datum Pn (pixel signal S1) reaches the saturation signal level.

Flip-flops 346_1-346_$n$ correspond to n pixel circuits 10 arranged side by side in the row direction in one column block CB. That is, flip-flop 346_$x$ ("x" is an integer in the range of 1-n) corresponds to the xth column of pixel circuits 10 of column block CB.

Demultiplexer 341 distributes the pixel data (P1, P2, . . . ) kept sequentially in flip-flop 343 to flip-flops (346_1 to 346_$n$) corresponding to pixel circuits 10 from which the pixel data are read. At that time, either pixel datum Pn or Pn+1 is selected corresponding to control signal Bn and is input into the corresponding flip-flop (346_1 to 346_$n$). That is, demultiplexer 341 selects pixel datum Pn (pixel signal S1) if pixel datum Pn (pixel signal S1) does not reach the saturation signal level and selects pixel datum Pn+1 (pixel signal S2) if the pixel data reaches the saturation signal level.

Demultiplexer 341 distributes the pixel data Pn, Pn+1 held in flip-flop 343 to flip-flops 344, 345, respectively.

Demultiplexer 341 performs the distribution under control of control circuit 4.

Serial conversion circuit 342 converts the pixel data (P1, P2, . . . ) held in flip-flops 346_1 to 346_$n$ into a serial signal string and outputs it to correction circuit 36.

Correction coefficient generation circuit 35 shown in FIG. 8 has signal ratio calculation circuit 351 and averaging circuit 352.

Signal ratio calculation circuit 351 calculates the signal ratio (S1/S2) between the pixel datum Pn (pixel signal S1) held in flip-flop 344 and the pixel datum Pn+1 (pixel signal S2) held in flip-flop 345.

Averaging circuit 352 calculates the average value of signal ratios (S1/S2) calculated in signal ratio calculation circuit 351 and outputs the calculated average value as correction coefficient K. Averaging circuit 352 calculates correction coefficient K for a prescribed number of frames and changes the calculated value of correction coefficient K when the frame is changed. For example, averaging circuit 352 calculates correction coefficient K by integrating the signal ratios (S1/S2) of a prescribed number of frames and outputs the calculated correction coefficient K to correction circuit 36 when the frame is switched. As the averaging method, it is possible to calculate the average value of the signal ratios every time a prescribed number of signal ratios (S1/S2) is obtained or calculate the moving average of signal ratios (S1/S2) input sequentially.

Correction circuit 36 shown in FIG. 8 has multiplier 361 and multiplexer 362.

Multiplier 361 multiplies the pixel data (P1, P2, . . . ) input sequentially from serial conversion circuit 342 by the correction coefficient K.

Multiplexer 362 selects either the image data or the data output from the multiplier 361 corresponding to the control signal (B1, B2, . . . ) accompanying pixel data (P1, P2, . . . ) input sequentially from rearrangement circuit 34 and sequentially outputs the data as sensitivity corrected pixel data Pdat. Multiplexer 362 selects the pixel datum if the input pixel datum is high-sensitivity pixel signal S1 and selects the output datum of multiplier 361 obtained by multiplying the pixel datum by correction coefficient K if the input pixel datum is low-sensitivity pixel signal S2.

Control Circuit 4

Control circuit 4 generates control signals used for controlling each constituent component of the image pickup device.

For example, control circuit 4 generates controls signals (φt, φs, φr, φx) for pixel circuit 10, a control signal used for sequentially selecting each row of pixel array 1 in vertical scan circuit 2, a control signal used for switching the connection according to a prescribed repetition pattern in connection circuit 31, a control signal used for holding the output signals (NS1, N1, NS2, N2) of pixel circuit 10 in readout circuits (RC1, RC2, . . . ), a control signal used for converting pixel data (P1, P2, . . . ) into a serial signal string in serial conversion circuit 33, a control signal used for rearranging the signal string of pixel data (P1, P2, . . . ) in rearrangement circuit 34, and a signal used for controlling the update timing of correction coefficient K in correction coefficient generation circuit 35.

In the following, the operation of an image pickup device having the aforementioned configuration will be explained.

Row signal lines (RW1, RW2, . . . ) are activated sequentially as a result of scanning of vertical scan circuit 2. When a row signal line is activated, pixel signals (NS1, N1, NS2, N2) are output from the pixel circuits 10 of one line (1 line) connected to that row. The pixel signals are input into readout processing circuit 3 via column signal lines (CM1, CM2, . . . ).

The n column signal lines (CM1 to CMn) included in one column block CB are connected to n+1 readout circuits (RC1 to RCn+1) via connection circuit 31. The number of readout circuits (RC1 to RCn+1) is one larger than the number of column signal lines (CM1 to CMn).

Among n column signal lines (CM1 to CMn), one column signal line is connected to two readout circuits RCn, RCn+1, while each of the remaining n−1 column signal lines is connected to only one readout circuit (RC1 to RCn−1).

Either high-sensitivity pixel signal S1 or low-sensitivity pixel signal S2 from one pixel circuit 10 is read out as pixel datum Pq from readout circuit RCq (q=1 to n−1). If pixel signal S1 does not reach the saturation signal level, pixel signal S1 is read out. If pixel signal S1 reaches the saturation signal level, pixel signal S2 is read out. A control signal Bq indicating the type of read out pixel signal (S1 or S2) is generated by readout circuit RCq. Pixel datum Pq and control signal Bq are input into correction circuit 36 via serial conversion circuit 33 and rearrangement circuit 34.

On the other hand, two pixel signals S1, S2 from one pixel circuit 10 are read out as pixel data Pn, Pn+1 by readout circuits RCn and RCn+1. Pixel signal S1 is read out by readout circuit RCn, while pixel signal S2 is read out by readout circuit RCn+1. The pixel signals S1, S2 of the same pixel are input into correction coefficient generation circuit 35 via serial conversion circuit 33 and rearrangement circuit 34 and are used to generate correction coefficient K.

Either pixel datum Pn or Pn+1 is selected in rearrangement circuit 34 and is input into correction circuit 36. If pixel datum Pn (pixel signal S1) does not reach the saturation signal level, pixel datum Pn will be selected. If pixel datum Pn reaches the saturation signal level, pixel datum Pn+1 (pixel signal S2) will be selected. A control signal Bn indicating the selection result is generated in rearrangement circuit 34 and is input along with the pixel datum into correction circuit 36.

Figure 9:
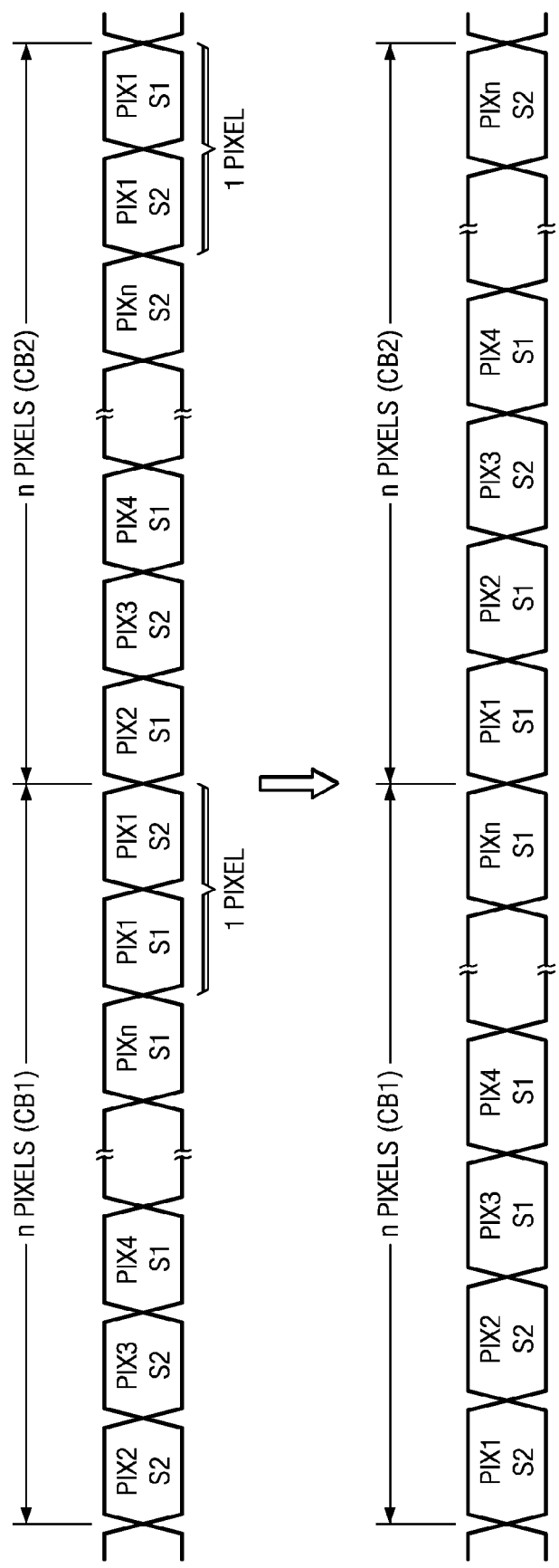
FIG. 9 illustrates an example of pixel data output from a serial conversion circuit and pixel data output from a rearrangement circuit.

FIG. 9 shows an example of pixel data output from serial conversion circuit 33 and pixel data output from rearrangement circuit 34.

The upper part of the figure shows the output of serial conversion circuit 33, while the lower part of the figure shows the output of rearrangement circuit 34. Symbols "PIX1," . . . , "PIXn" represent the n pixels in a column block. The numbers attached to the symbols indicate the order of the column.

In the example shown in FIG. 9, two pixel data (S1 and S2) are read out from the pixel circuit 10 of the first column in column block CB, while one pixel datum (S1 or S2) is read out from the pixel circuit 10 of each of the other columns. The two pixel data (S1 and S2) read out from the pixel circuit 10 of the first column become the end of a signal string in the output of serial conversion circuit 33 (upper part in FIG. 9). The signal string is rearranged by rearrangement circuit 34 so that the arrangement of the pixel data matches the arrangement of the pixels in pixel array 1. As a result of the rearrangement, the pixel datum read out from the pixel circuit 10 of the first column becomes the first datum of the signal string. One of the two pixel data (S1 and S2) read out from the pixel circuit 10 of the first column and selected corresponding to control signal Bn is inserted as the first signal in the signal string.

The signal levels of the pixel data (P1, P2, . . . ) input into correction circuit 36 are corrected corresponding to their sensitivity characteristics (S1 or S2). If the pixel datum has low sensitivity (S2), the pixel datum is corrected to a high-sensitivity pixel datum by being multiplied by correction coefficient K. A pixel datum with high sensitivity (S1) is output directly. Whether a pixel datum has high sensitivity (S1) or low sensitivity (S2) is determined based on control signal (B1, B2, . . . ) input along with the pixel datum.

When reading of the pixel data of the next line is started after the pixel data of one line have been read, the connection state of connection circuit 31 is changed. That is, the one column signal line connected to the two readout circuits RCn and RCn+1 is changed every time one line is read out. The change is performed based on a certain repetition pattern.

For example, in FIG. 4, the solid line and dotted line show different connection states of connection circuit 31. In the state indicated by the solid line, the two readout circuits RCn, RCn+1 are connected to column signal line CM1. In the state indicated by the dotted line, the two readout circuits RCn, RCn+1 are connected to column signal line CM2.

Figure 10:
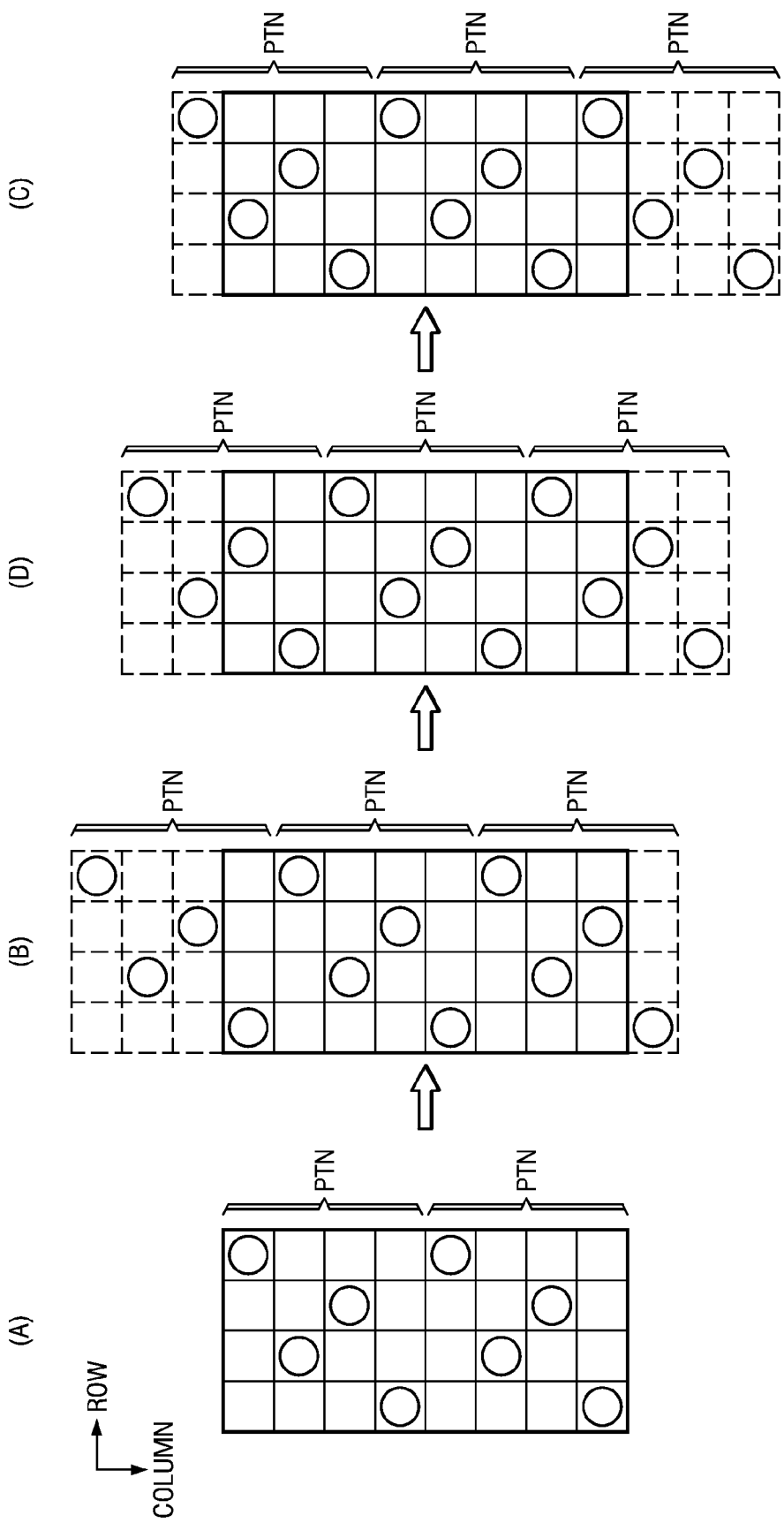
FIG. 10 illustrates an example of the repetition pattern in the connection state of the connection circuit in the image pickup device of the first embodiment.

FIG. 10 illustrates an example of the repetition pattern of the connection state of connection circuit 31.

In the example shown in FIG. 10, the size of column block CB is set at 8 rows and 4 columns to facilitate illustration. Each square is one pixel circuit 10. The mark ○ in a square indicates pixel circuit 10 connected to two readout circuits RC4, RC5 (FIGS. 6, 7).

In a column block CB with 8 rows and 4 columns, the pixel circuits 10 with mark ○ are arranged in a regular pattern. For example, as shown in FIG. 10, among the 8 rows and 4 columns, a pattern PTN of 4 rows and 4 columns is repeated. In the pattern PTN of 4 rows and 4 columns, a pixel circuit 10 with mark ○ is arranged for each column. The pattern PTN shows a case in which each of the 4 column signal lines is connected to two readout circuits RC4, RC5 once when reading out 4 lines.

As shown in FIGS. 10(A) to (D), the regular pattern of 8 rows and 4 columns shifts by 1 section per frame in the column direction. The pattern of the bottom row is returned to the top as a result of the shifting in the column direction. When the pattern shown in FIG. 10(D) is reached, return to the pattern shown in FIG. 10(A) occurs. FIGS. 10(A) to (D) show one repetition pattern. In one loop of the repetition pattern, each of the pixel circuits 10 of the 8 rows and 4 columns is connected to two readout circuits RC4, RC5 once. In other words, the pixel data of each of the pixel circuits 10 are input once into correction coefficient generation circuit 35 and are used to generate correction coefficient K.

As explained above, in the image pickup device of this embodiment, the column signal lines CM1 to CMn of n pixel circuits 10 are connected to n+1 readout circuits RCn to RCn+1 via connection circuit 31. Among n column signal lines CM1 to CMn, one column signal line is connected to two readout circuits (RCn, RCn+1), while each of the rest of the n−1 column signal lines is only connected to one readout circuit (RC1 to RCn−1). Either high-sensitivity pixel signal S1 or low-sensitivity pixel signal S2 is selected and read out from the readout circuits (RC1 to RCn−1) that are connected to the column signal lines in a one-to-one relationship. If pixel signal S1 does not reach the saturation signal level, high-sensitivity pixel signal S1 will be read out. If pixel signal S1 reaches the saturation signal level, low-sensitivity pixel signal S2 will be read out. On the other hand, two pixel signals S1, S2 of the same pixel are output from the two readout circuits (RCn, RCn+1) connected to one column signal line. The correction coefficient K for the sensitivity of the pixel signal is generated corresponding to the signal ratio (S1/S2) between the two pixel signals S1, S2. The level of low-sensitivity pixel signal S2 read out by readout circuits (RC1, RC2, . . . ) is corrected to the signal level corresponding to the high-sensitivity characteristic by correction coefficient K.

As described above, in the image pickup device of this embodiment, since the information (S1/S2) needed for generating correction coefficient K can be obtained by using readout circuits (RC1 to RCn+1) that number one more than the pixels, the circuit area can be reduced significantly compared with the case in which twice as many readout circuits as the number of the pixels are needed to generate correction coefficient K.

In the image pickup device of this embodiment, when the number of readout circuits used to generate correction coefficient K is reduced, the information amount and the power consumption needed for processing can be kept low. In a system using twice as many readout circuits as the number of pixels, the data rate is doubled compared with a normal CMOS sensor, and the rate increase percentage is 100%. On the other hand, in the image pickup device of this embodiment, for example, if N=32, the number of readout circuits is 33. The data rate increase percentage of the pixel signals is only about 3% (1/N) as a result of increasing the number of readout circuits by 1. Consequently, a wide dynamic range can be realized by slightly increasing the data rate compared with a normal CMOS sensor.

In the image pickup device of this embodiment, correction coefficient K is generated corresponding to a value obtained by averaging the ratios (S1/S2) of the pixel signals S1, S2 read out from plural pixel circuits 10.

If the image is too bright, high-sensitivity image signal S1 is saturated. If the image is too dark, low-sensitivity pixel signal S2 becomes very small and is easily affected by noise. An appropriate signal ratio (S1/S2) is obtained as correction coefficient K for intermediate luminance. If correction coefficient K is generated based only on the pixel signals (S1, S2) of a single pixel circuit 10, an appropriate correction coefficient K cannot be generated when the incident light of the pixel circuit 10 is too bright or too dark.

If correction coefficient K is generated corresponding to the average value of plural signal ratios (S1/S2) as described above, the influence of variation in the signal ratio (S1/S2) caused by unevenness of the brightness of the picked-up image can be alleviated. Even if defective pixel circuits 10 are included, their influence can be alleviated by their being averaged with other regular pixel circuits 10.

In addition, in the image pickup device of this embodiment, the column signal line connected to two readout circuits (RCn, RCn+1) is changed based on a prescribed repetition pattern every time a line is scanned by the vertical scan circuit 2.

If the column signal line connected to the two readout circuits (RCn, RCn+1) is fixed, for example, when picking up an image having bright and dark stripes that extend in the column direction, the value of correction coefficient K will be affected by pixel signals (S1, S2) obtained from extremely bright or dark pixels, and the sensitivity characteristic cannot be corrected appropriately. If a column including defective pixel circuit 10 is always connected to two readout circuits (RCn, RCn+1), the sensitivity characteristic cannot be appropriately corrected. In this embodiment, since the connection state of connection circuit 31 is changed every time a line is scanned, the influence of the content of the image to pick up and the influence of defective pixel circuit 10 can be alleviated.

Additionally, in the image pickup device of this embodiment, in one loop of the repetition pattern depending on connection circuit 31 (for example, FIGS. 10(A) to (D)), each pixel circuit 10 included in pixel array 1 is connected to two readout circuits (RCn, RCn+1) via one column signal line once. In this way, since the information of signal ratio (S1/S2) is obtained uniformly from pixel circuits 10 included in pixel array 1 and is used to generate correction coefficient K, the influence of the content of the image to pick up and the influence of defective pixel circuit 10 can be further alleviated.

In the image pickup device of this embodiment, the same correction coefficient K is provided to a series of pixel data that form one image picked up in pixel array 1 (pixel data constituting 1 frame), and correction coefficient K is not updated during one frame. Since correction coefficient K is used equally for a series of pixel data, if its value changes significantly during an image, stripe-shaped noise extended in the row direction will be generated. In this embodiment, generation of such image noise can be prevented by controlling the timing of changing correction coefficient K.

Second Embodiment

In the following, a second embodiment of the present invention will be explained.

In the image pickup device of the aforementioned first embodiment, the column signal line connected to two readout circuits (RCn, RCn+1) was changed based on a prescribed repetition pattern in connection circuit 31. In the image pickup device of this embodiment, the connection state between other readout circuits (RC1 to RCn−1) and the column signal lines is also changed based on a prescribed repetition pattern.

Figure 11:
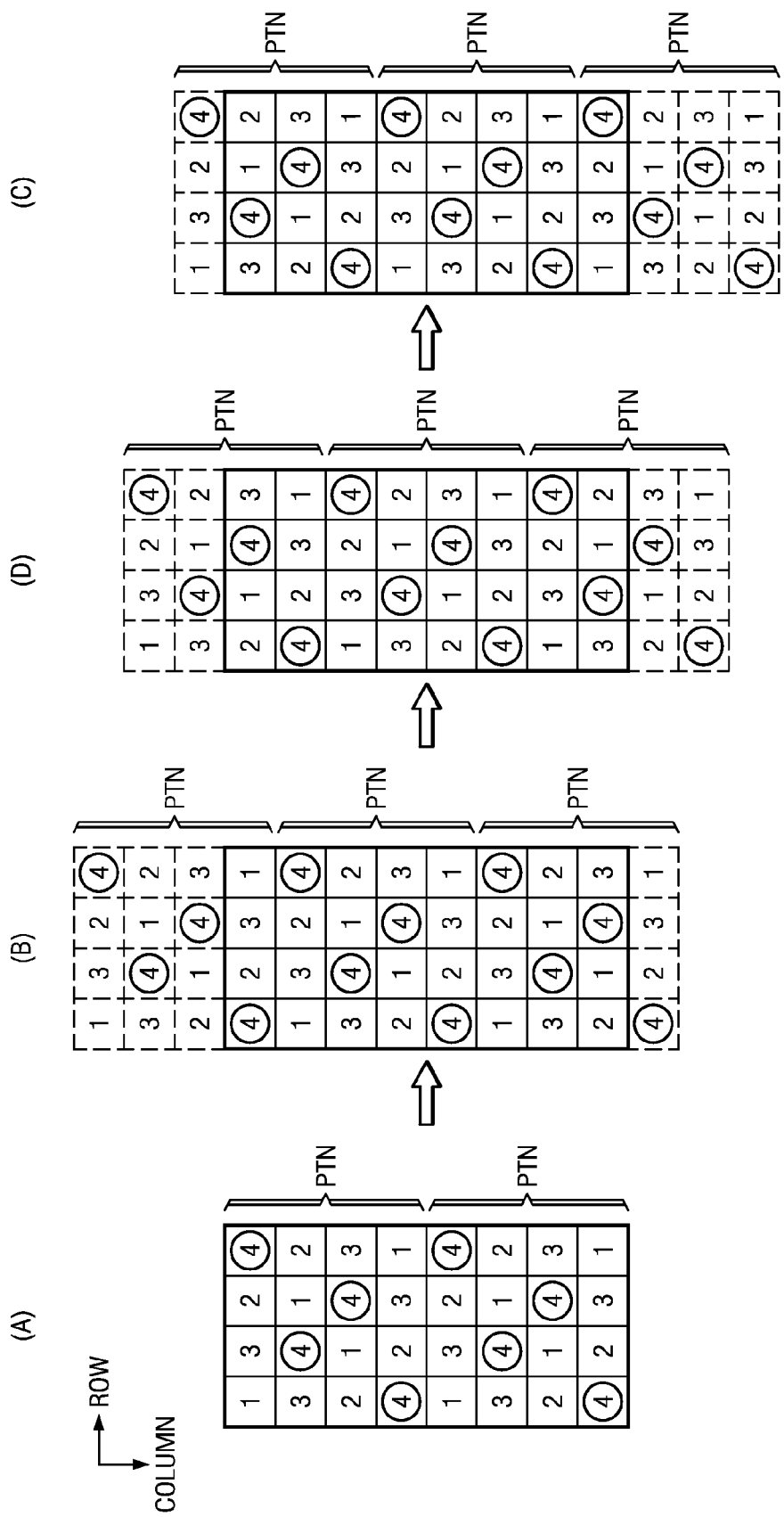
FIG. 11 illustrates an example of the repetition pattern in the connection state of the connection circuit in the image pickup device of a second embodiment.

FIG. 11 illustrates an example of the repetition pattern for the connection state of the connection circuit 31 in the image pickup device of this embodiment.

In the figure, the number in each square indicates the number of the readout circuit (RC1 to RC5) connected to pixel circuit 10. Two readout circuits (RC4, RC5/FIGS. 6, 7) are connected to pixel circuits 10 with mark ○, while one readout circuit (R1 to R3/FIG. 5) is connected to each of the other pixel circuits 10.

Similar to FIG. 10, in the example shown in FIG. 11, a regular pattern with 8 rows and 4 columns also shifts 1 section per frame in the column direction and returns to the original state after 4 frames. In one loop of the repetition pattern (FIGS. 11(A) to (D)), each of the pixel circuits 10 of the 8 rows and 4 columns is connected once to two readout circuits RC4, RC5.

In the regular pattern with 8 rows and 4 columns, pattern PTN with 4 rows and 4 columns is repeated. In pattern PTN with 4 rows and 4 columns, each column has one pixel circuit with mark ○ connected to readout circuits RC4 and RC5 and pixel circuits 10 connected to readout circuits R1 to R3. In other words, the connection of 4 columns and 5 readout circuits (RC1 to RC5) is dispersed uniformly, and a specific readout circuit is not connected to a specific column.

Since each readout circuit has an amplifier or the like as shown in FIGS. 5 to 7, the output signal includes error that is caused by the circuit characteristic and that is irrelevant to the pixel signal. The error varies for each readout circuit depending on the unevenness in the circuit characteristic. Therefore, if a specific column is always connected to a specific readout circuit, the error will appear as longitudinal stripe-shaped noise in a fixed pattern on the image.

In the image pickup device of this embodiment, since each readout circuit is connected uniformly to each column of pixel block CB, generation of the aforementioned image noise can be effectively prevented.

Third Embodiment

In the following, a third embodiment of the present invention will be explained.

In the image pickup device of the aforementioned first embodiment, the same pair of readout circuits (RCn, RCn+1) is always used as the readout circuits for reading out the two pixel signals (S1, S2) from the same pixel. In the image pickup device of this embodiment, however, the pair of readout circuits is changed corresponding to the connection pattern of connection circuit 31.

The image pickup device of this embodiment has a different configuration for readout circuits (RC1 to RCn+1) from the image pickup device shown in FIGS. 1 to 8.

Figure 12:
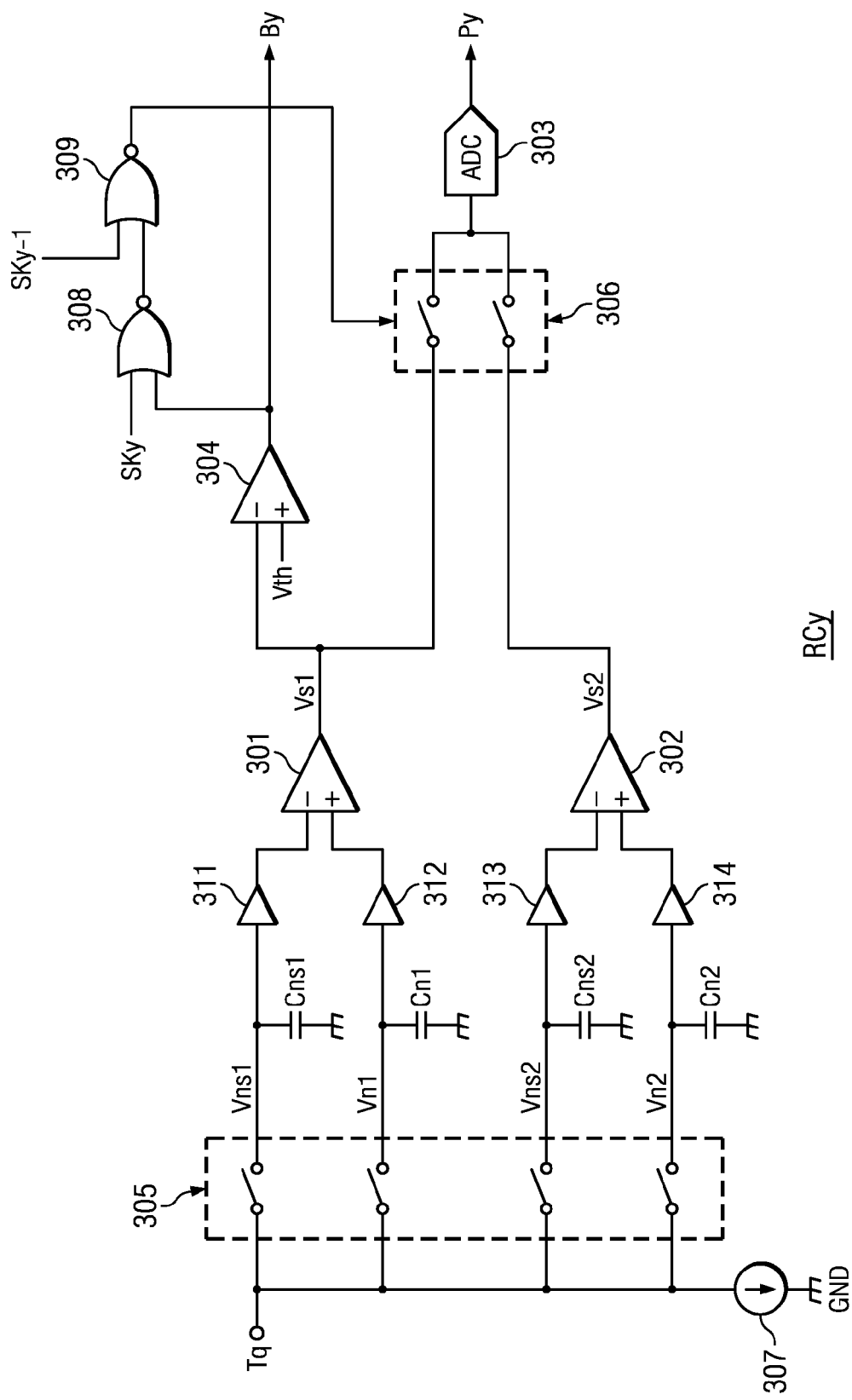
FIG. 12 illustrates a configuration example of the readout circuit in the image pickup device of a third embodiment.

FIG. 12 illustrates a configuration example of readout circuit RCy ("y" is an integer in the range of 1 to n+1) in the image pickup device of this embodiment. The readout circuit RCy shown in FIG. 12 has the same configuration as readout circuit RCq shown in FIG. 5 and has NOR circuits 308 and 309.

NOR circuit 308 calculates the inverted OR of control signal Bq output from comparison circuit 304 and control signal SKy.

NOR circuit 309 calculates the inverted OR of the output signal of NOR circuit 308 and control signal SKy−1. The output signal of NOR circuit 309 is input into switch circuit 306. Switch circuit 306 selects voltage Vs1 when the output signal of NOR circuit 309 is "1" and selects voltage Vs2 when the output signal of NOR circuit 309 is "0."

Control signals SK1 to SKn indicate the two readout circuits used for reading out the two pixel signals (S1, S2) of the same pixel. They are generated by control circuit 4. One of control signals SK1 to SKn is set at "1" (high level), while the others are set at "0" (low level). Control signals SK0 and SKn+1 are fixed at "0."

If control signal SKy is "1" (high level), "0" is output from the NOR circuit 308 of readout circuit RCy. At that time, since control signal SKy−1 is "0," "1" is output from the NOR circuit 309 of readout circuit RCy. Consequently, high-sensitivity pixel signal S1 is read out from readout circuit RCy. Since control signal SKy of "1" is input into the NOR circuit 309 of readout circuit RCy+1, the output of NOR circuit 309 becomes "0." Consequently, low-sensitivity pixel signal S2 is read out from readout circuit RCy+1.

As described above, when control signal SKy is set at "1," high-sensitivity pixel signal S1 is read out from readout circuit RCy, while low-sensitivity pixel signal S2 is read out from readout circuit RCy+1.

On the other hand, since all other control signals (SK1 to SKn) besides control signal SKy are "0," NOR circuits 308, 309 in the other readout circuits besides readout circuits RCy, RCy+1 become equivalent to NOT circuits. In these readout circuits, since a signal having the same value as control signal Bq is input into switch circuit 306, a readout operation equivalent to that of readout circuit RCq shown in FIG. 5 is performed.

In the image pickup device of this embodiment, as shown in FIG. 12, since control signals (By, By+1) are generated in the two readout circuits (RCy, RCy+1) connected to the same pixel circuit 10, the comparison circuit 347 of rearrangement circuit 34 (FIG. 8) can be omitted. In this case, demultiplexer 341 selects one of the two pixel data (Py, Py+1) corresponding to control signal (By, By+1) transferred from readout circuit (RCy, RCy+1) via serial conversion circuit 33 and inputs the selected pixel datum into the corresponding flip-flops (461-1 to 461-n).

Figure 13:
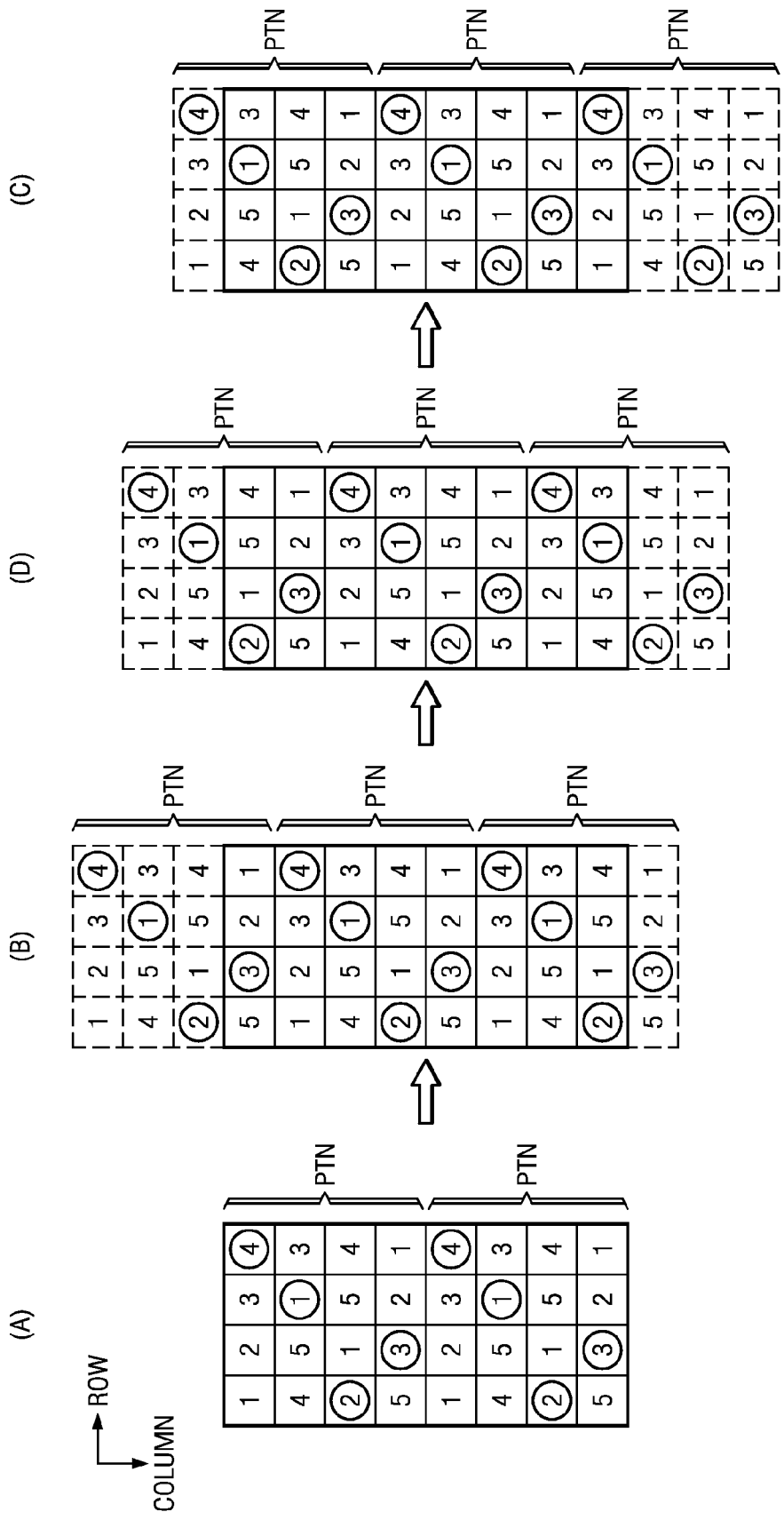
FIG. 13 illustrates an example of the repetition pattern in the connection state of the connection circuit in the image pickup device of the third embodiment.
Figure 14:
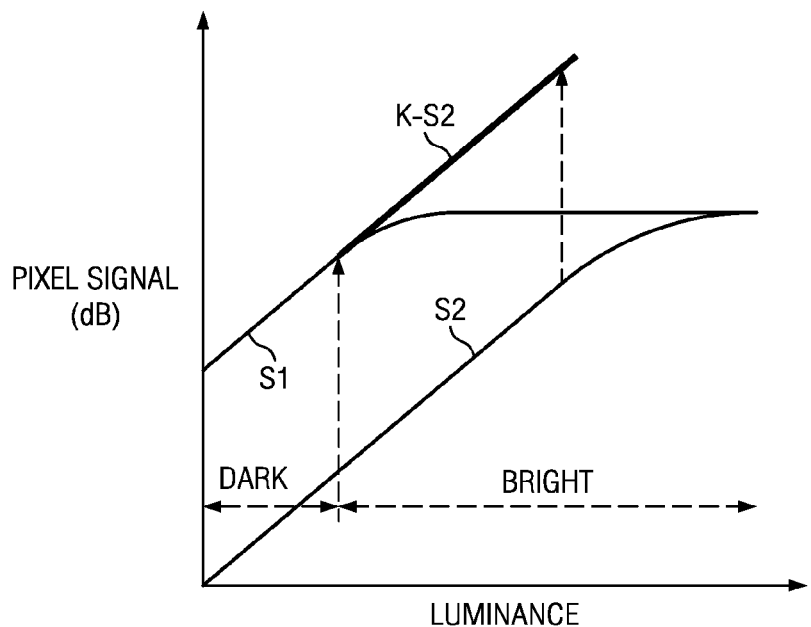
FIG. 14 is a diagram explaining the correction processing in a CMOS image sensor that generates a high-sensitivity pixel signal and a low-sensitivity pixel signal.
Figure 15:
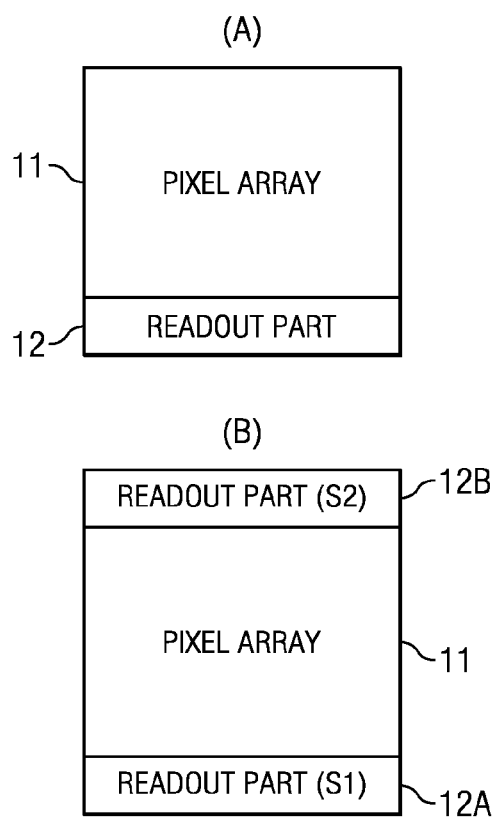
FIG. 15 illustrates a comparative example of the area between a normal CMOS sensor and a wide dynamic range CMOS sensor.

FIG. 13 illustrates an example of the repetition pattern of the connection state of connection circuit 31 in the image pickup device of this embodiment. The numbers and symbols used in this figure are defined in the same way as those used in FIG. 11.

The repetition pattern shown in FIG. 13 is different from the pattern shown in FIG. 11 in the fact that the two readout circuits connected to pixel circuit 10 with mark ○ vary. In the example shown in FIG. 13, each readout circuit (RC1 to RC5) is connected to pixel circuit 10 with mark ○ at almost the same frequency.

As described above, in this embodiment, since the influence of variation in the characteristic of each readout circuit on correction coefficient K can be averaged by varying the readout circuits related to generation of correction coefficient K, the sensitivity can be corrected more appropriately.

Several embodiments of the present invention have been explained above. The present invention is not limited to the aforementioned embodiments and also includes various variations.

For example, when high-sensitivity pixel signal S1 and/or low-sensitivity pixel signal S2 deviate from a prescribed range, correction coefficient generation circuit 35 can exclude the signal ratio calculated for those pixel signals from the averaging samples.

More specifically, for example, a judgment circuit is adopted to determine whether pixel signals (S1, S2) input into correction coefficient generation circuit 35 are in a prescribed range. Averaging part 352 excludes a signal ratio related to the pixel signals that deviates from a prescribed range from the averaging samples corresponding to the judgment result of the judgment circuit.

In this way, it is possible to effectively avoid generation of inappropriate correction coefficient K under the influence of extremely bright pixels or extremely dark pixels.

When the signal ratio calculated in signal ratio calculation circuit 351 deviates from a prescribed range, correction coefficient generation circuit 35 can also exclude the signal ratio from the averaging samples.

In the aforementioned embodiments, the connection state of connection circuit 31 is varied based on a certain repetition pattern. The present invention, however, is not limited to this. For example, it is also possible to vary the connection state of connection circuit 31 randomly or fix the connection state of connection circuit 31 without varying it.

In the aforementioned embodiments, the sensitivity is corrected by correction circuit 36 with respect to the image data after they are rearranged by rearrangement circuit 34. However, the present invention is not limited to this. For example, correction circuit 36 can be provided in the previous stage of rearrangement circuit 34 and the sensitivity of the pixel data to be input from serial conversion circuit 33 to rearrangement circuit 34 can be corrected.

In the aforementioned embodiments, a comparison circuit 347 used for generating control signal Bn is provided in rearrangement circuit 34 (FIG. 8). The present invention is not limited to this. For example, it is also possible to provide a comparison circuit in readout circuit RCn (FIGS. 6, 7). In this case, the comparison circuit can compare threshold value Vth with voltage Vs1 in the stage previous to AD converter 303 or compare threshold value Pth with pixel data Pn (pixel signal S1) in the stage after AD converter 303.

In the aforementioned embodiments, AD conversion is performed in each readout circuit. The present invention, however, is not limited to this. For example, AD conversion is possible in the stage after serial conversion circuit 33.

In the aforementioned embodiments, n column signal lines are connected to n+1 readout circuits by connection circuit 31. However, n column signal lines can be connected to n+2 or more readout circuits.

The image pickup device of the present invention can be constituted by one semiconductor chip or plural semiconductor chips.

What is claimed is:

1. An image pick up device comprising:
a pixel array including plural pixel circuits, each pixel circuit generating a first pixel signal having a first sensitivity level and a second pixel signal having a second sensitivity level, the second sensitivity level lower than said first sensitivity level;
N signal lines;
a pixel scanning circuit that sequentially selects N pixel circuits in said pixel array and outputs said first and second pixel signals from the selected N pixel circuits to said N signal lines in a time division manner;
a plurality of readout circuits in a number at least 1 larger than N;
a connection circuit connecting at least one pair of said readout circuits to one signal line of said N signal lines and connecting each other of said readout circuits to a corresponding one of other of said N signal lines, whereby each readout circuit selecting and outputting either said first pixel signal or second pixel signal input from said corresponding one of said N signal lines;
a correction coefficient generation circuit that generates a correction coefficient corresponding to the sensitivity ratio between said first sensitivity level and said second sensitivity level;
a correction circuit that corrects the level of said second pixel signal output from each of said readout circuits to a signal level corresponding to said first sensitivity level based on said correction coefficient;
wherein each of said readout circuits selects and outputs said first pixel signal if said first pixel signal is smaller than a threshold value corresponding to the saturation signal level of the first sensitivity level and selects and outputs the second pixel signal if said first pixel signal is larger than said threshold value;
wherein for said pair of readout circuits connected to one signal line, a first readout circuit of said pair of readout circuits selects and outputs said first pixel signal and a second readout circuit of said pair of readout circuits selects and outputs said second pixel signal; and
wherein said correction coefficient generation circuit generates said correction coefficient corresponding to a signal ratio between first pixel signal output from a first readout circuit of a pair of readout circuits connected to one signal line and the second pixel signal output from said second readout circuit of said pair of readout circuits.

2. The image pickup device of claim 1, wherein:
said correction coefficient generation circuit generates said correction coefficient corresponding to an average of said signal ratios between said first and second pixel signals read out from plural said pixel circuits.

3. The image pickup device of claim 2, wherein
said connection circuit changes said one signal line connected to said pair of readout circuits out of said N signal lines based on a prescribed repetition pattern every time said pixel scanning circuit selects N new pixel circuits.

4. The image pickup device of claim 3, wherein:
said connection circuit connects each pixel circuit included in said pixel array to said pair of readout circuits via one of said signal lines the same number of times in one loop of said proscribed repetition pattern.

5. The image pickup device of claim 4, wherein:
said correction coefficient generation circuit supplies a same correction coefficient to said correction circuit with respect to a series of pixel signals from said pixel array.

6. The image pickup device of claim 2, further comprising:
a serial conversion circuit connected to said plural readout circuits converting signals output in parallel from said plural readout circuits into a serial signal string; and
a rearrangement circuit that rearranges the pixel signals of the N pixel circuits corresponding to a connection state of said connection circuit when said N pixel circuits are selected in said pixel scanning circuit such that pixel signals of said N pixel circuits are arranged side by side sequentially corresponding to the arrangement of said N pixel circuits in said pixel array in the serial signal string output from said serial conversion circuit.

7. The image pickup device of claim 6, wherein:
said readout circuit includes a comparison circuit comparing said first pixel signal input from said signal line with said threshold value and outputs a control signal indicating a comparison result;
said serial conversion circuit converts said control signal along with said pixel signals into said serial signal string; and
said correction circuit determines whether each pixel signal included in said signal string is said second pixel signal based on said control signal and performs said correction to pixel signals identified as said second pixel signals.

8. The image pickup device of claim 7, wherein:

said plural readout circuits each include
- a first readout circuit that outputs said first pixel signal, and
- a second readout circuit that outputs said second pixel signal;

said connection circuit connects said first and second readout circuits to one of said signal lines and changes said one signal line based on a prescribed repetition pattern; and said correction coefficient generation circuit generates said correction coefficient corresponding to the ratio between said first pixel signal output from said first readout circuit and said second pixel signal read out from said second readout circuit.

9. The image pickup device of claim 8, wherein:

said connection circuit changes said two readout circuits connected to a common signal line out of said plural readout circuits based on said prescribed repetition pattern; and when two of said readout circuits are connected to said common signal line by said connection circuit, one of the two readout circuits functions as said first readout circuit, while the other readout circuit functions as said second readout circuit.

* * * * *